United States Patent
Lee et al.

(10) Patent No.: US 12,157,966 B2
(45) Date of Patent: Dec. 3, 2024

(54) WASHING MACHINE AND CONTROL METHOD THEREOF

(71) Applicant: LG Electronics Inc., Seoul (KR)

(72) Inventors: Jeonguk Lee, Seoul (KR); Manho Chun, Seoul (KR); Joonho Pyo, Seoul (KR)

(73) Assignee: LG Electronics Inc., Seoul (KR)

( * ) Notice: Subject to any disclaimer, the term of this patent is extended or adjusted under 35 U.S.C. 154(b) by 1063 days.

(21) Appl. No.: 17/091,727

(22) Filed: Nov. 6, 2020

(65) Prior Publication Data

US 2021/0198832 A1   Jul. 1, 2021

(30) Foreign Application Priority Data

Dec. 26, 2019  (KR) .......................... 10-2019-0175218
Dec. 26, 2019  (KR) .......................... 10-2019-0175219

(51) Int. Cl.
  D06F 37/40  (2006.01)
  D06F 23/04  (2006.01)
  (Continued)

(52) U.S. Cl.
  CPC .............. D06F 37/40 (2013.01); D06F 23/04 (2013.01); D06F 37/24 (2013.01); D06F 37/304 (2013.01); *D06F 33/36* (2020.02); *D06F 33/40* (2020.02); *D06F 33/47* (2020.02); *D06F 2103/46* (2020.02); *D06F 2105/46* (2020.02); *D06F 2105/54* (2020.02); *F16D 27/14* (2013.01); *F16D 2500/10406* (2013.01);
  (Continued)

(58) Field of Classification Search
  CPC ........ D06F 23/04; D06F 37/24; D06F 37/304; D06F 37/40
  See application file for complete search history.

(56) References Cited

U.S. PATENT DOCUMENTS 6,148,646 A * 11/2000 Koshiga .................. D06F 37/40
                                                      68/23.7
6,332,343 B1 * 12/2001 Koketsu ................ D06F 37/304
                                                      68/12.02
(Continued)

FOREIGN PATENT DOCUMENTS

| KR | 1020030023316 | 3/2003 |
|----|---------------|--------|
| KR | 101892012 | 8/2018 |
| WO | WO2020138992 | 7/2020 |

OTHER PUBLICATIONS

Electronic translation of KR 10-1892012-B1. (Year: 2018).*
Office Action in Australian Appln. No. 2020264410, dated Jun. 30, 2021, 11 pages.

*Primary Examiner* — Joseph L. Perrin
(74) *Attorney, Agent, or Firm* — Fish & Richardson P.C.

(57) ABSTRACT

A control method for a washing machine includes: a mode change step in which the configuration of a coupler is moved by operating a solenoid module in such a way that a drive shaft for spinning a pulsator and a dewatering shaft for spinning a washing tub are axially coupled or decoupled; and a mode check step in which a drive motor for rotating the drive shaft is operated and the load of current outputted to the drive motor is sensed, the mode check step comprising a coupler setting step in which, if the load of current outputted to the drive motor does not satisfy a set load value, the solenoid module is operated to reposition the coupler.

14 Claims, 28 Drawing Sheets

(51) Int. Cl.
   *D06F 37/24*   (2006.01)
   *D06F 37/30*   (2020.01)
   *D06F 33/36*   (2020.01)
   *D06F 33/40*   (2020.01)
   *D06F 33/47*   (2020.01)
   *D06F 103/46*   (2020.01)
   *D06F 105/46*   (2020.01)
   *D06F 105/54*   (2020.01)
   *F16D 27/14*   (2006.01)
   *H02P 23/20*   (2016.01)
   *H02P 29/00*   (2016.01)

(52) U.S. Cl.
   CPC ............... *F16D 2500/11* (2013.01); *F16D 2500/30818* (2013.01); *H02P 23/20* (2016.02); *H02P 29/0027* (2013.01)

(56) References Cited

U.S. PATENT DOCUMENTS

| | | | | |
|---|---|---|---|---|
| 7,089,769 B2* | 8/2006 | Lim | ............ | D06F 37/40 |
| | | | | 68/133 |
| 7,454,929 B2* | 11/2008 | Cho | ............ | D06F 37/304 |
| | | | | 68/133 |
| 7,621,158 B2* | 11/2009 | Roepke | ............ | D06F 37/40 |
| | | | | 192/69.7 |
| 7,841,218 B2* | 11/2010 | Dominguez | ............ | F16D 25/061 |
| | | | | 68/133 |
| 9,157,176 B2* | 10/2015 | Lee | ............ | D06F 37/40 |

* cited by examiner

WASHING MACHINE AND CONTROL METHOD THEREOF

CROSS-REFERENCE TO RELATED APPLICATIONS

This application claims the benefit of priority to Korean Application No. 10-2019-0175218, filed on Dec. 26, 2019, and Korean Application No. 10-2019-0175219, filed on Dec. 26, 2019. The disclosures of the prior applications are incorporated by reference in their entirety.

TECHNICAL FIELD

The present disclosure relates to a washing machine with a clutch that is operated by a solenoid and a control method thereof.

BACKGROUND

A top-loading washing machine comprises a washing tub and pulsator which spin to agitate laundry or wash water within a water tank. The washing tub spins by the rotation of a dewatering shaft, and the pulsator spins by the rotation of a drive shaft, with the drive shaft and the dewatering shaft having a structure in which they rotate about the same axis of rotation.

Incidentally, a driving force caused by the rotation of a drive motor may be transferred to the drive shaft or dewatering shaft, in order to selectively or simultaneously spin the washing tub and the pulsator depending on the washing method and the washing stroke.

The drive shaft may have a structure in which it is connected to the drive motor and rotate when the drive motor rotates. Also, the dewatering shaft may have a structure in which the torque of the drive motor is transferred or not, depending on the configuration of a coupler.

In Korean Laid-Open Patent No. 10-2001-0002545, a separate motor and link structure for adjusting the configuration of a coupler is included. This link structure, however, may bring about problems of structural complexity and narrow space due to the complicated structure may bring out problems of structural complexity and narrow space due to the complicated structure.

Korean Laid-Open Patent No. 10-2003-0023316 discloses a structure in which the configuration of a coupler is adjusted by operating a solenoid. In this disclosed structure, it is possible to figure out the initial configuration of the coupler by the operation of the solenoid; however, the problem of heat generation from a coil, the problem of power consumption, and the problem of damage to the coupler caused by power disconnection due to abnormal operation may occur because the solenoid requires continuous power application in order to keep the coupler in a higher position to where it is moved.

Moreover, in a structure where the drive shaft and the dewatering shaft are axially coupled or decoupled by changing the configuration of the coupler, an operation error may actually occur in the drive motor during a wash stroke or dewatering stroke, due to a configuration error in the coupler, the coupler getting stuck while meshing, or an error in the drive motor.

SUMMARY

A first aspect of the present disclosure is to provide a washing machine capable of adjusting the configuration of a coupler without continuous application of power to a solenoid, in a structure where the configuration of the coupler is adjusted by the operation of a solenoid.

A second aspect of the present disclosure is to provide a washing machine capable of identifying the position of a coupler for selectively driving a dewatering shaft without a sensor, and a control method thereof.

A third aspect of the present disclosure is to provide a washing machine capable of solving problems caused by a configuration error, when there is an error related to malfunctioning of the drive motor.

The aspects of the present disclosure are not limited to the above-mentioned aspects, and other aspects that have not been mentioned will be clearly understood to those skilled in the art from the following description.

To accomplish the above aspects, there is provided a control method for a washing machine, the method comprising: a mode change step in which the configuration of a coupler is moved by operating a solenoid module in such a way that a drive shaft for spinning a pulsator and a dewatering shaft for spinning a washing tub are axially coupled or decoupled; and a mode check step in which a drive motor for rotating the drive shaft is operated and the load of current outputted to the drive motor is sensed, whereby the configuration of the coupler may be adjusted.

The mode check step comprises repetitively performing the sensing of the load of current outputted to the drive motor and the determining of whether the load of current applied to the drive motor satisfies a set load value, wherein, if the load of current applied to the drive motor does not satisfy a set load value, the error count is increased, thus increasing the accuracy of detection of errors caused by the configuration of the coupler.

The mode check step comprises performing the coupler setting step when the error count equals a first set value, thus solving problems caused by improper configuration of the coupler.

The coupler setting step comprises a mode resetting step in which the solenoid module is operated such that the drive shaft and the dewatering shaft are placed in an axially coupled position, whereby the configuration of the coupler may be adjusted.

The coupler setting step comprises, after the mode resetting step, selectively performing a first mode change step to operate the solenoid module and dispose the coupler in such a way that the drive shaft and the dewatering shaft are axially decoupled, whereby the configuration of the coupler may be adjusted.

The mode resetting step comprises operating the solenoid module to make the coupler move to a set height or lower and place the coupler in a position that axially couples the drive shaft and the dewatering shaft.

The mode resetting step comprises: operating the drive motor to rotate the drive shaft connected to the pulsator; and operating the solenoid module to generate an attractive force in the coupler which axially couples or decouples the dewatering shaft connected to an inner tub and the drive shaft depending on the configuration, whereby the coupler may be placed in a position that axially couples the drive shaft and the dewatering shaft.

The mode change step comprises: a first mode change step in which the configuration of the coupler is changed to axially decouple the drive shaft and the dewatering shaft; and a second mode change step in which the configuration of the coupler is changed to axially couple the drive shaft and the dewatering shaft, wherein, in the mode change step, when the first mode change step is performed, the coupler setting step comprises performing the first mode change step after the mode resetting step, whereby the configuration of the coupler may be adjusted to the mode change step.

The mode check step comprises, after the coupler setting step, operating the drive motor for rotating the drive shaft, sensing the load of current outputted to the drive motor, and increasing the error count if the load of current applied to the drive motor does not satisfy a set load value, whereby errors in the motor itself may be detected.

The mode check step comprises sending a motor error signal when the error count equals a second set value which is greater than the first set value, whereby the user may be notified of an error that cannot be corrected by changing the configuration of the coupler.

The mode change step comprises: a first mode change step in which the configuration of the coupler is changed to axially decouple the drive shaft and the dewatering shaft; and a second mode change step in which the configuration of the coupler is changed to axially couple the drive shaft and the dewatering shaft, wherein the mode check step comprises performing a clothes loosening stroke when the error count equals the second set value after the first mode change step is performed in the mode change step, whereby errors caused by entanglement of clothes, rather than errors in the motor itself, may be corrected.

The mode check step comprises sending the motor error signal after the clothes loosening stroke if the load of current applied to the drive motor does not satisfy a set load value, whereby the user may be notified of an error that cannot be corrected by a clothes loosening stroke.

The control method comprises a mode implementation step in which the drive motor is operated if the load of current outputted to the drive motor satisfies a set load value, whereby, if there is no error detected in the motor, a washing stroke or dewatering stroke may be implemented.

Details of other embodiments are included in the detailed description and drawings.

DETAILED DESCRIPTION

Figure 1:
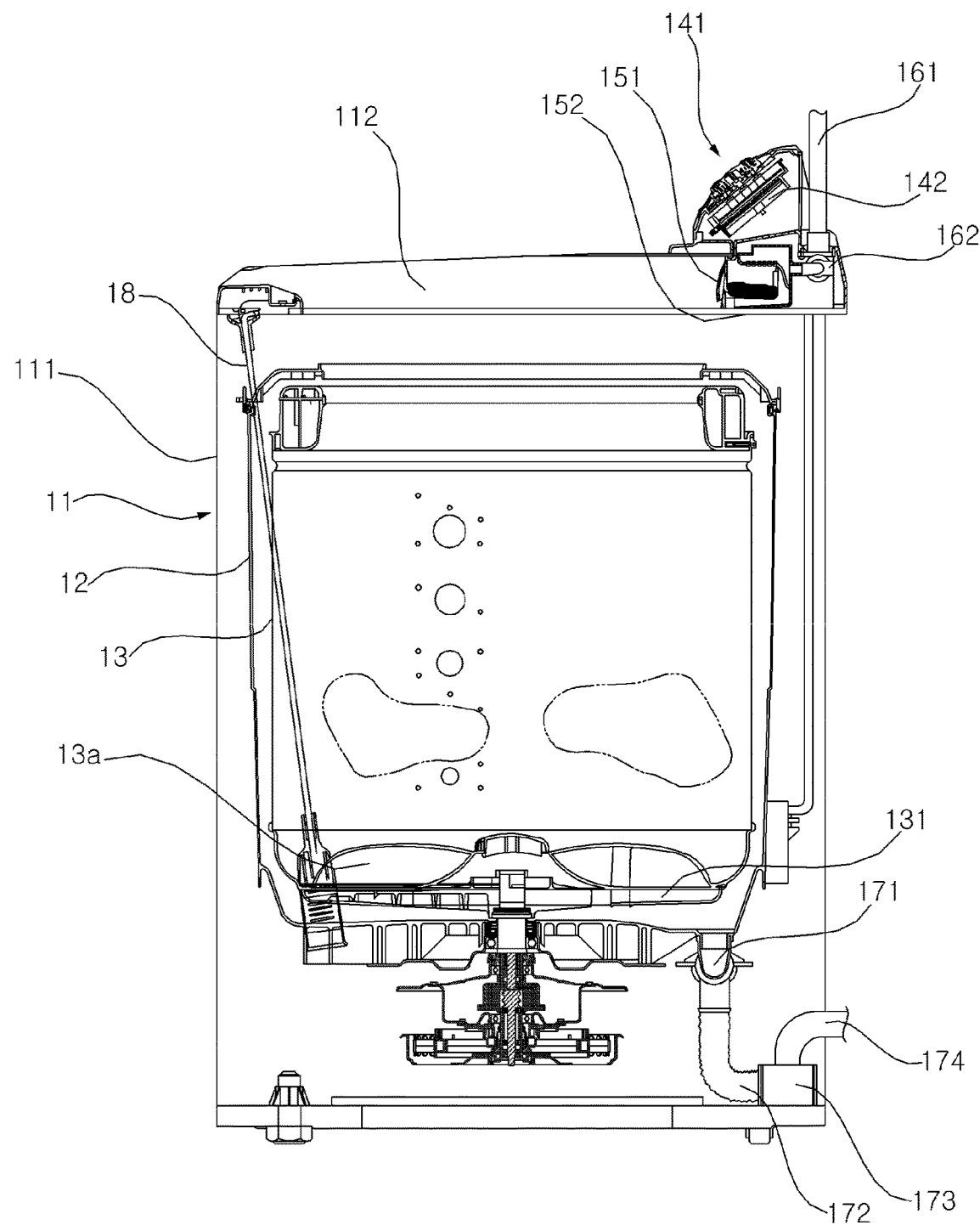
FIG. 1 is a schematic cross-sectional view of a washing machine comprising a drive assembly according to an exemplary embodiment of the present disclosure.
Figure 2:
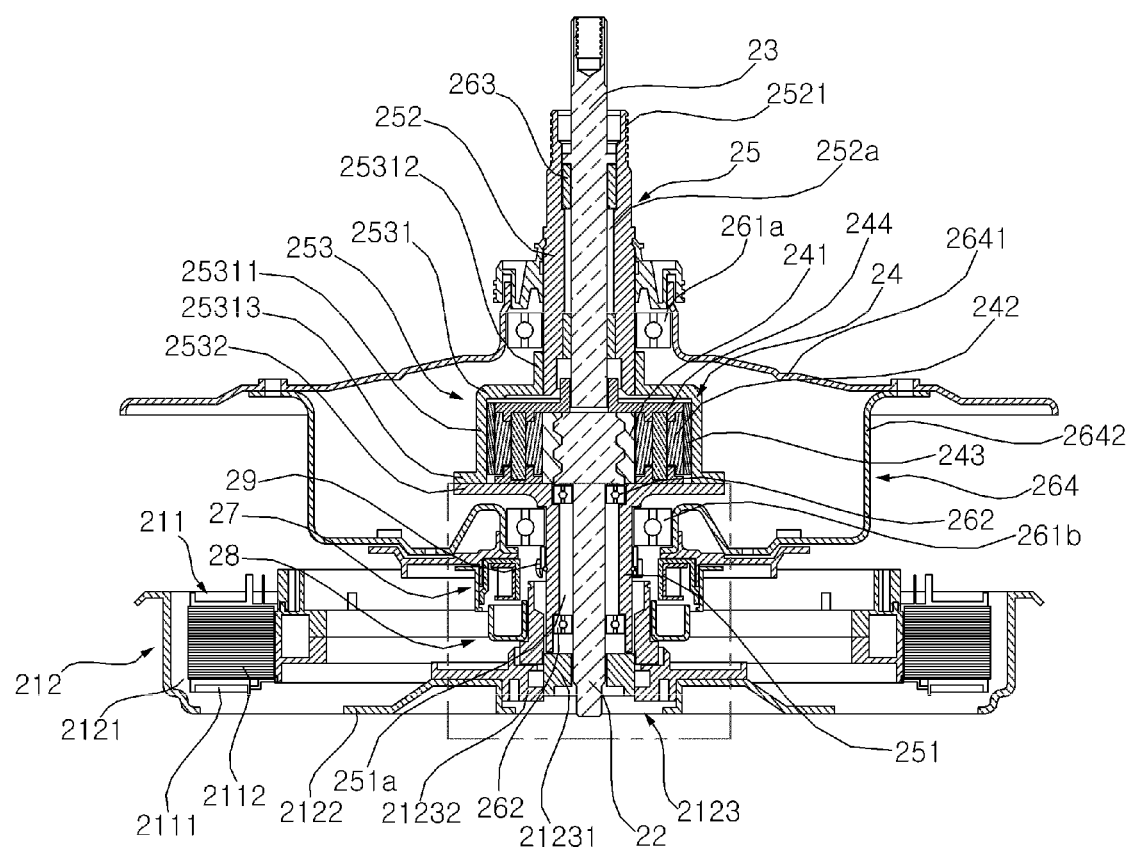
FIG. 2 is a cross-sectional view of a drive assembly according to an exemplary embodiment of the present disclosure.
Figure 3:
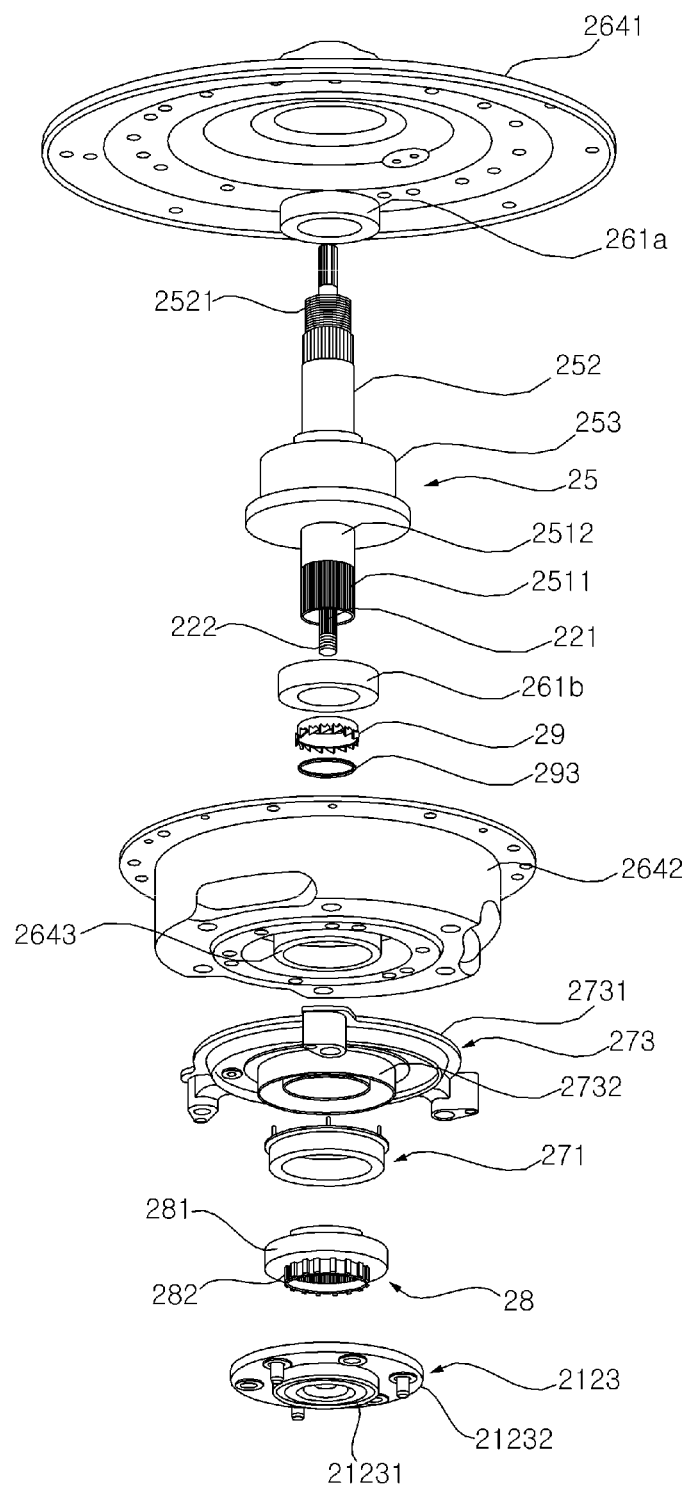
FIG. 3 is an exploded perspective view of some of the components of a drive assembly according to an exemplary embodiment of the present disclosure.
Figure 4:
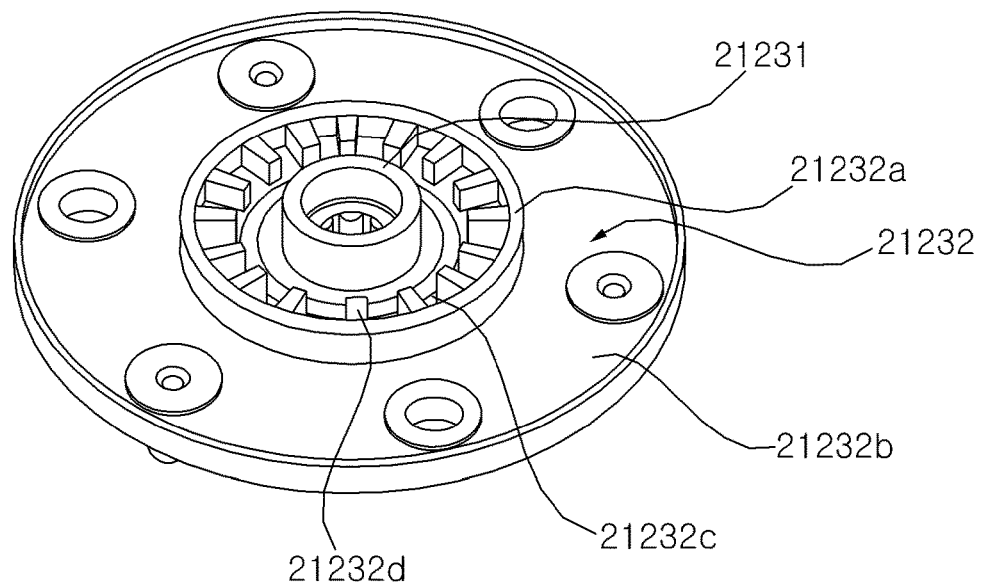
FIG. 4 is a perspective view of a rotor hub according to an exemplary embodiment of the present disclosure.
Figure 5:
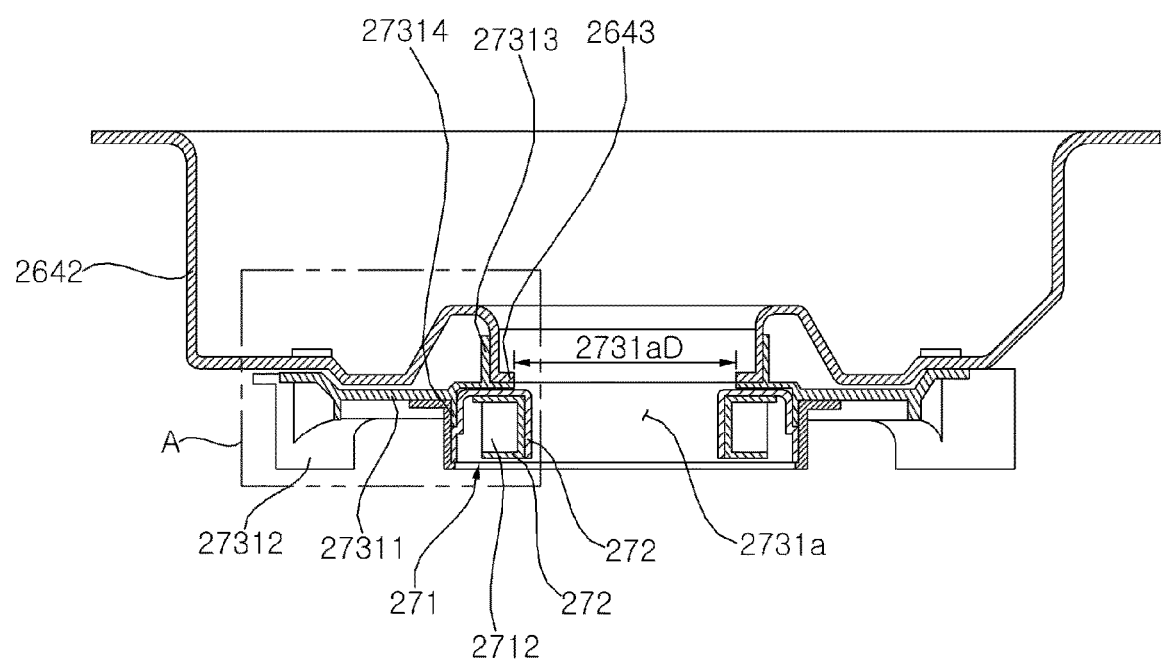
FIG. 5 is a cross-sectional view of a bearing housing and a solenoid module according to an exemplary embodiment of the present disclosure.
Figure 6:
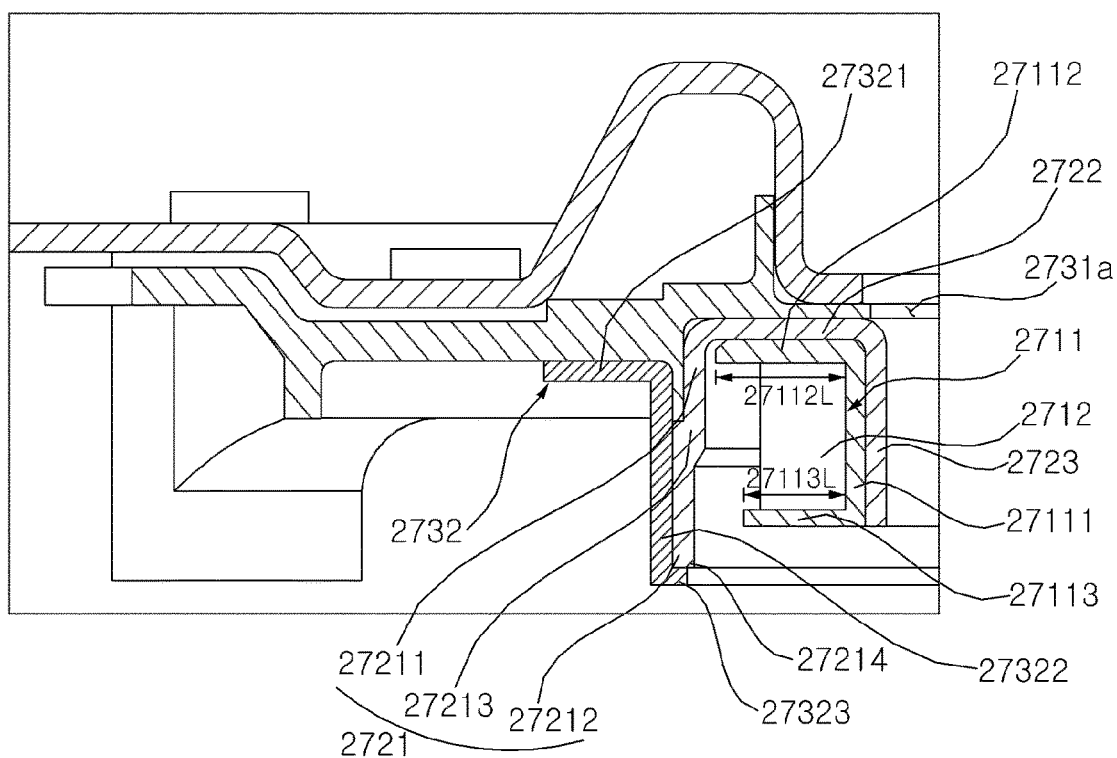
FIG. 6 is an enlarged view of A in FIG. 5.
Figure 7:
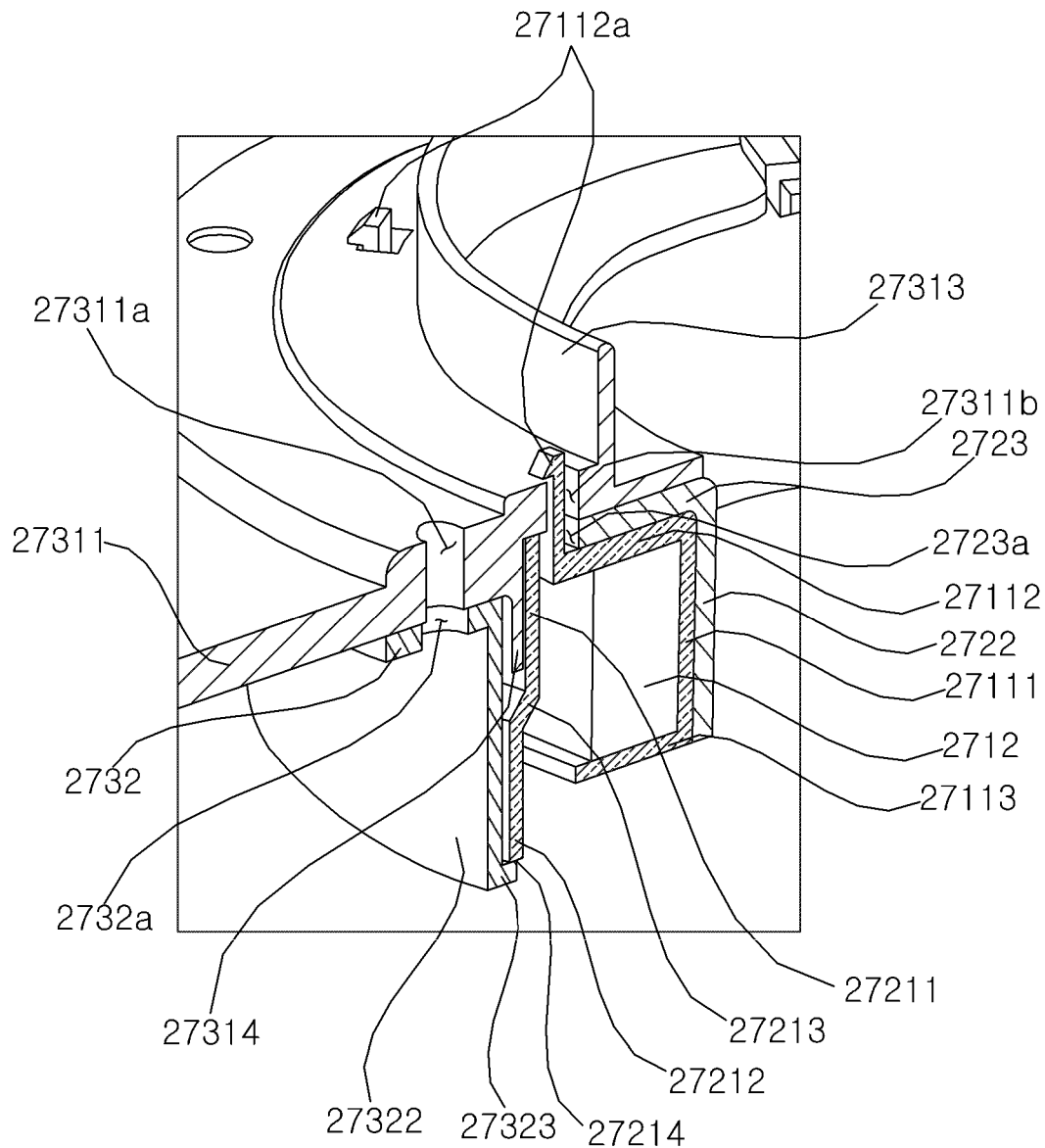
FIG. 7 is a cross-sectional perspective view of a bearing housing and a solenoid module according to an exemplary embodiment of the present disclosure.
Figure 8:
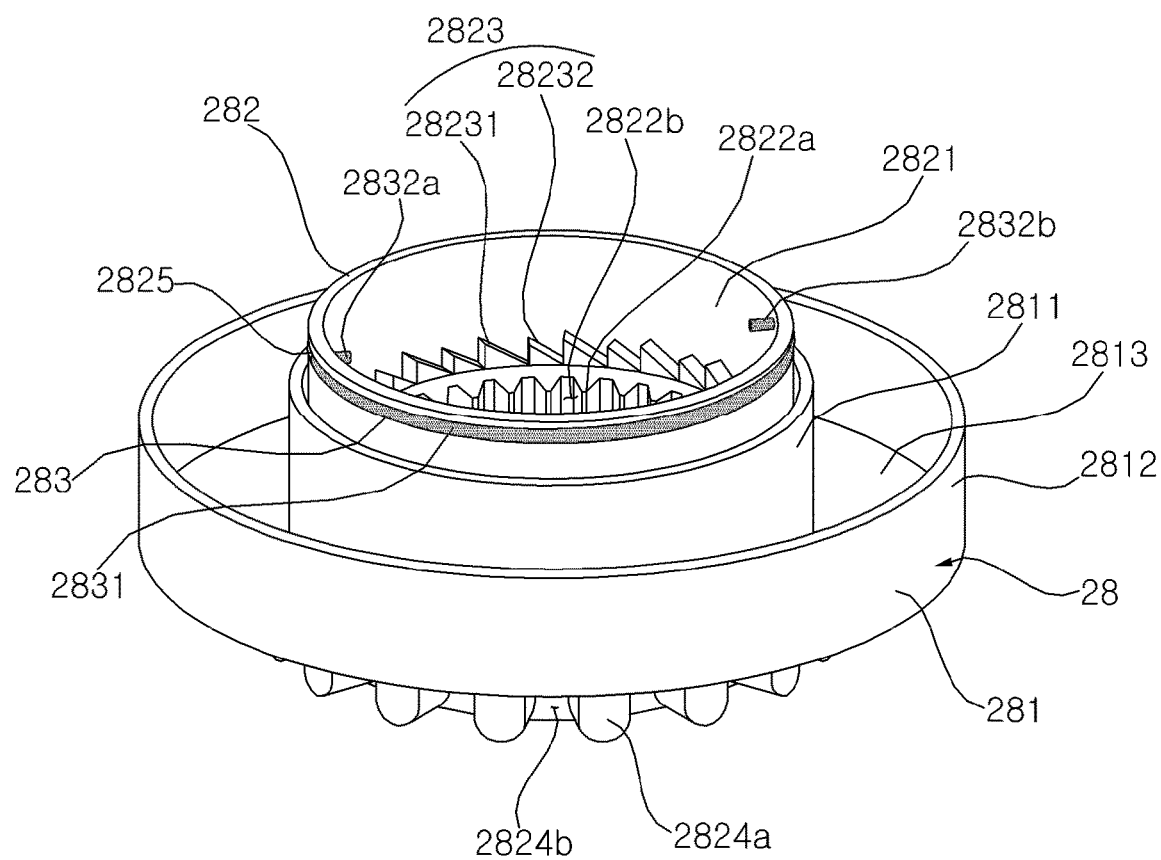
FIG. 8 is a perspective view of a coupler according to an exemplary embodiment of the present disclosure.
Figure 9:
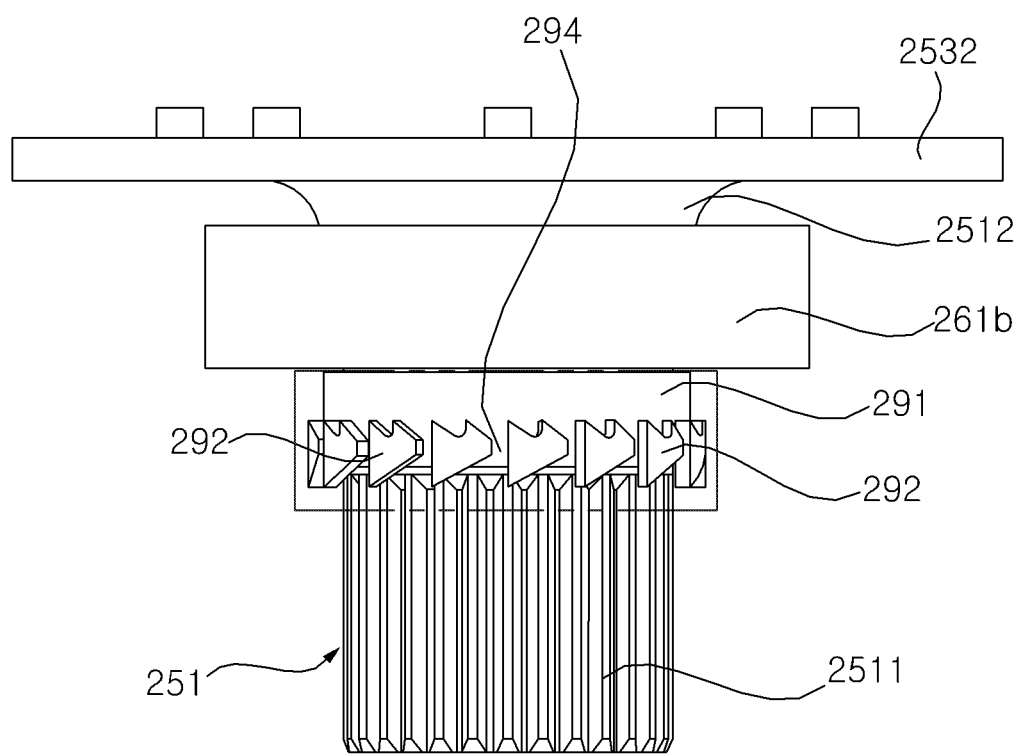
FIG. 9 is a view for explaining the coupling of a dewatering shaft and a coupler guide according to an exemplary embodiment of the present disclosure.
Figure 10:
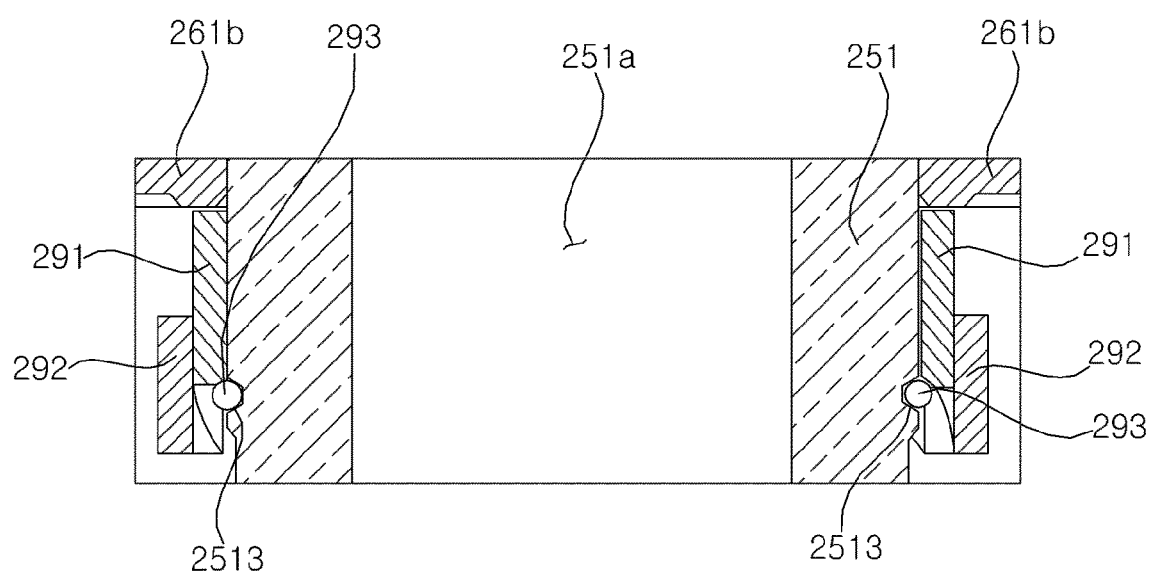
FIG. 10 is a cross-sectional view for explaining the coupling of a dewatering shaft and a coupler guide according to the present disclosure.
Figure 11:
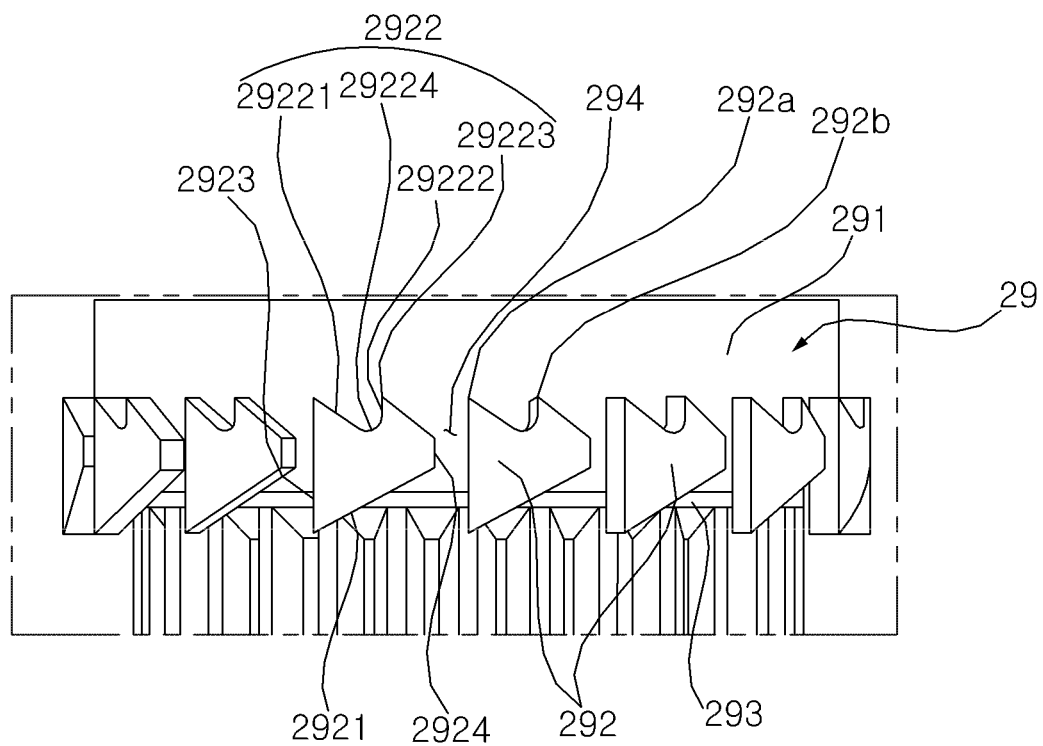
FIG. 11 is an enlarged view of B in FIG. 9.
Figure 12A:
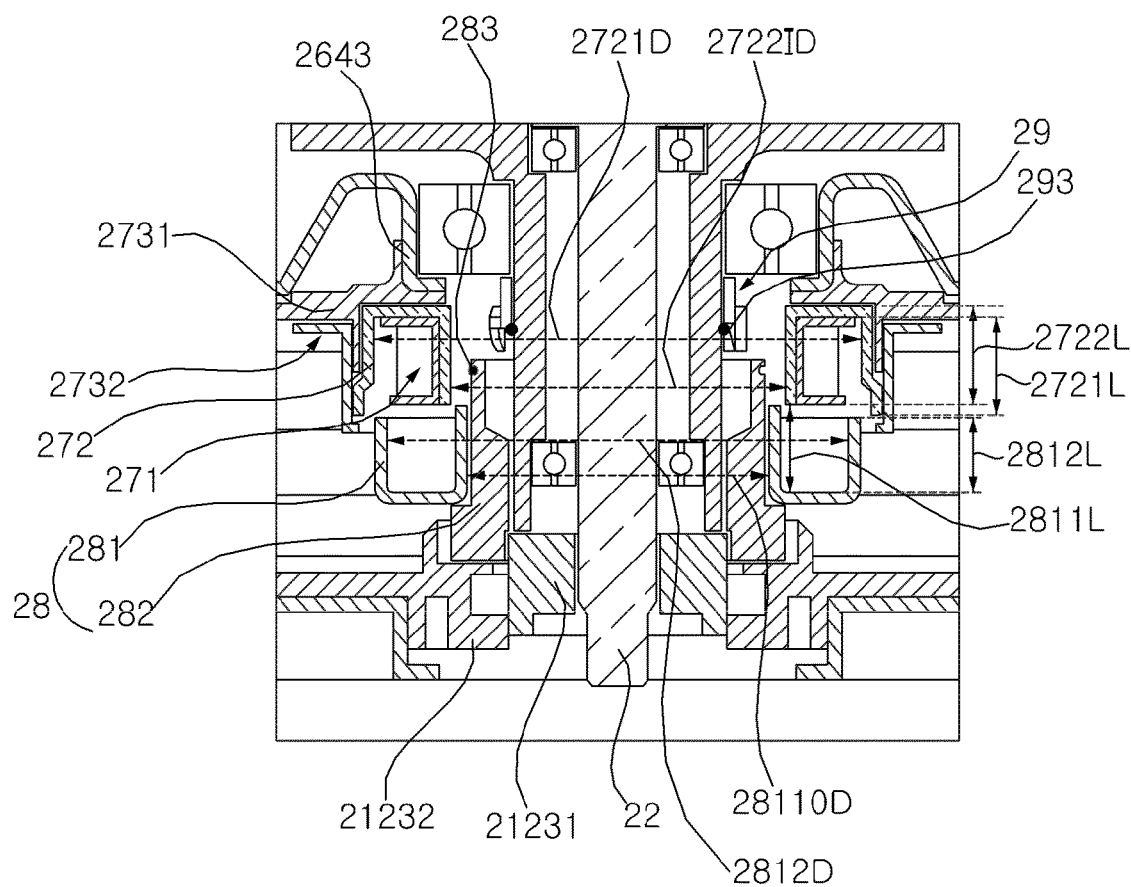
FIG. 12A is a cross-sectional view illustrating the configuration of a coupler, a solenoid module, and a coupler guide when the coupler is coupled to a coupling flange according to an exemplary embodiment of the present disclosure.
Figure 12B:
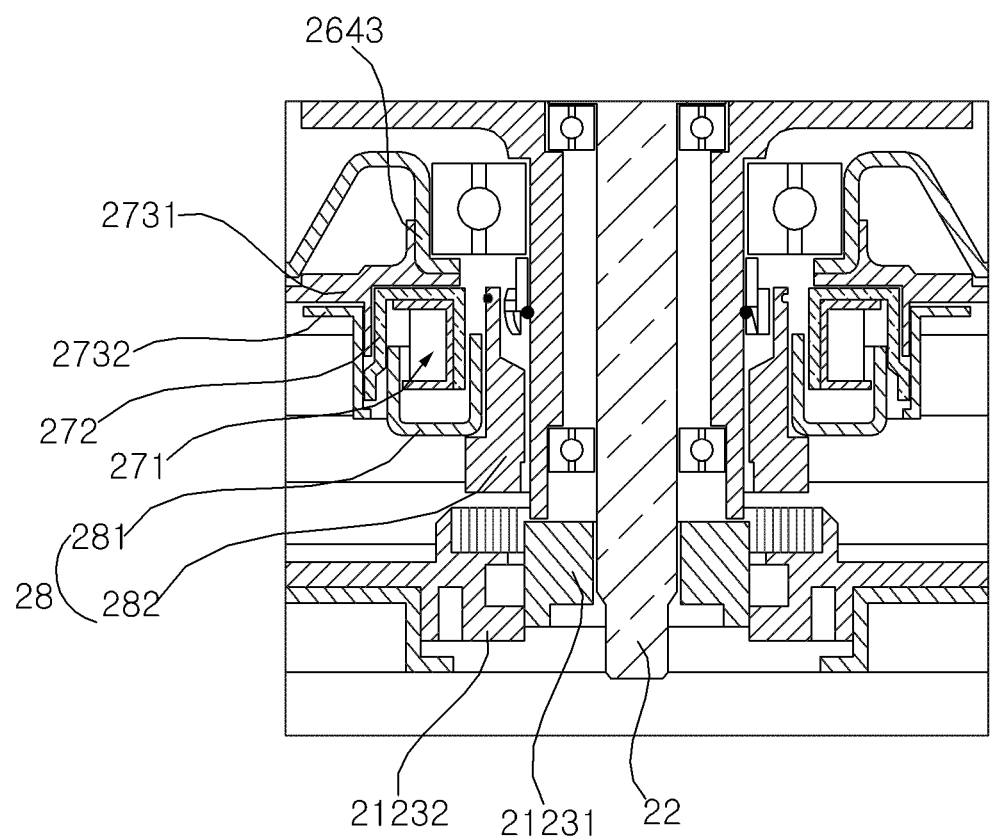
FIG. 12B is a cross-sectional view illustrating the configuration of a coupler, a solenoid module, and a coupler guide when the coupler is decoupled from a coupling flange according to an exemplary embodiment of the present disclosure.
Figure 13A:
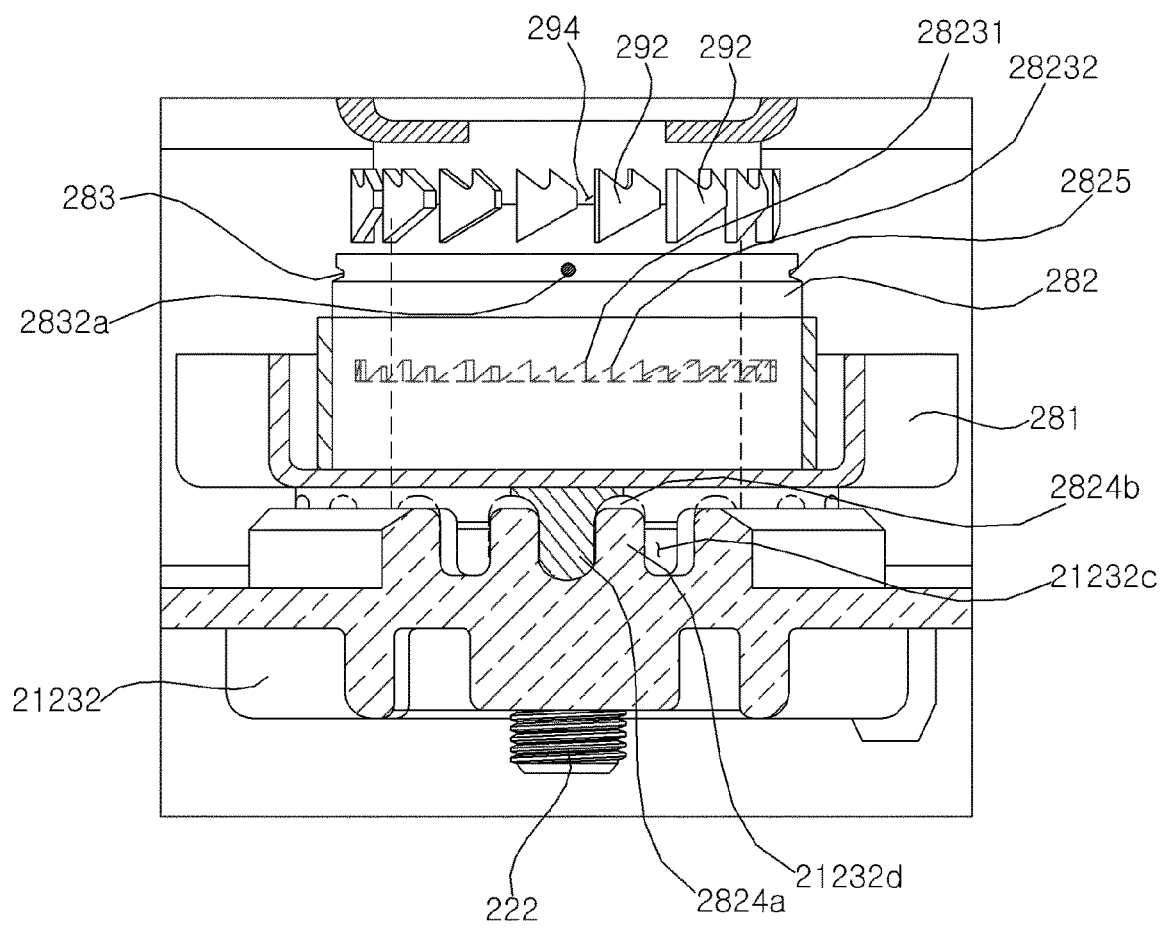
FIG. 13A is a view for explaining the relationship between a coupler and a coupling flange and the relationship between the coupler and a coupler guide, when the coupler is coupled to the coupling flange, according to an exemplary embodiment of the present disclosure.
Figure 13B:
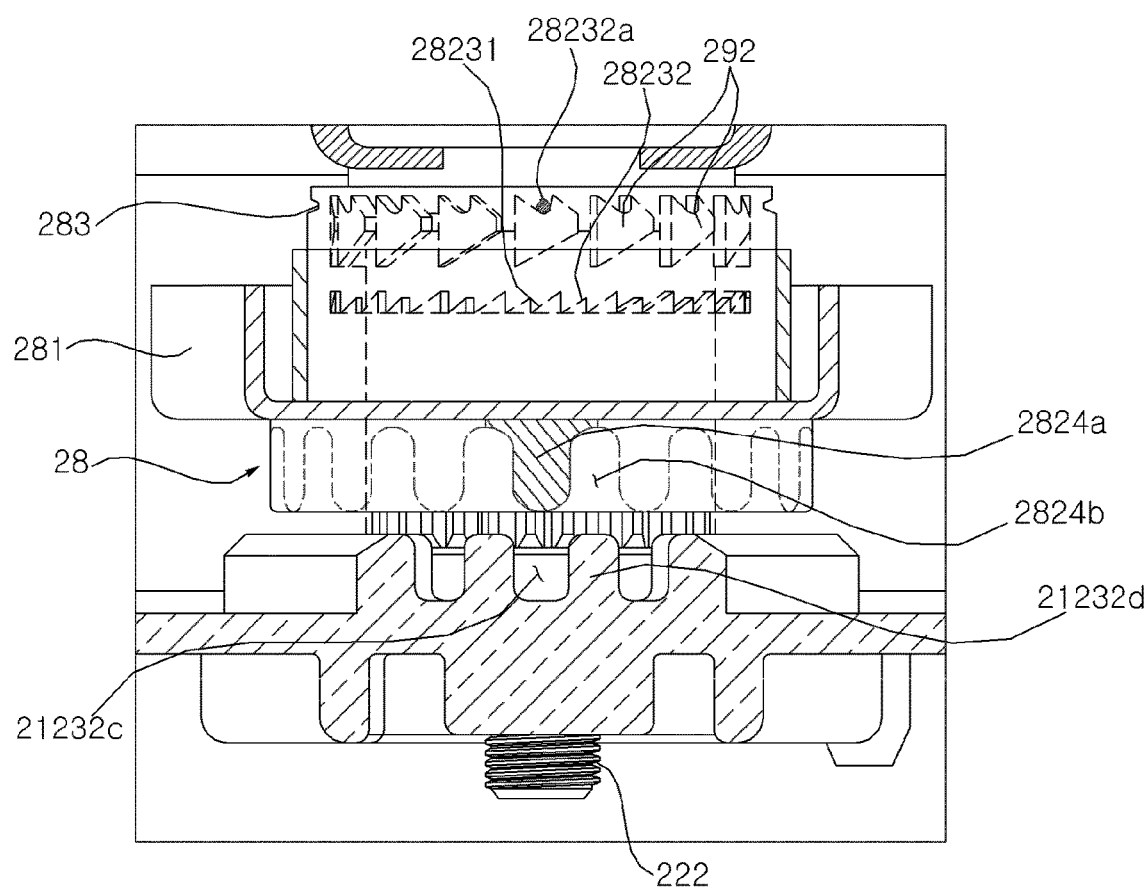
FIG. 13B is a view for explaining the relationship between a coupler and a coupling flange and the relationship between the coupler and a coupler guide, when the coupler is decoupled from the coupling flange, according to an exemplary embodiment of the present disclosure.

Advantages and features of the present disclosure and methods for achieving them will be made clear from embodiments described below in detail with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. The present disclosure is merely defined by the scope of the claims. Like reference numerals refer to like elements throughout the specification.

Hereinafter, the present disclosure will be described with reference to the drawings for explaining a washing machine according to exemplary embodiments of the present disclosure.

<Overall Construction>

Referring to FIG. 1, an overall structure of a washing machine will be briefly described below.

A washing machine according to an exemplary embodiment of the present disclosure may comprise a casing 11 which forms the exterior and forms a space on the inside where a water tank 12 is contained. The casing 11 may comprise a cabinet 111 with an open top, and a top cover 112 attached to the open top of the cabinet 111, with a loading opening approximately in the center through which laundry is loaded. A door (not shown) for opening and closing the loading opening may be rotatably attached to the top cover 112.

A suspension 18 for suspending the water tank 12 within the casing 11 may be provided. The upper end of the suspension 18 may be connected to the top cover 112, and the lower end may be connected to the water tank 12, and the suspension 18 may be provided at each of the four corners in the casing 11.

The control panel 141 may be provided on the top cover 112. An input part (for example, a button, a dial, a touchpad, etc.) for receiving various control commands from a user for operational control of the washing machine and a display (for example, an LCD, an LED display, etc.) for visually displaying the operating status of the washing machine may be provided on the control panel 141.

A water supply pipe 161 for guiding water supplied from an external source of water such as a water tap and a water supply valve 162 for controlling the water supply pipe 161 may be provided. The water supply valve 162 may be controlled by a controller 142. The controller 142 may control the overall operation of the washing machine, as well as the water supply valve 162. The controller 142 may comprise a microprocessor with a memory for data storage. Unless mentioned otherwise, it will be understood that the control of electric/electronic parts constituting the washing machine is done by the controller 142.

A drawer 151 for containing detergent may be slidably housed in a drawer housing 152. After water supplied through the water supply valve 162 is mixed with detergent as it passes through the drawer 151, the water is pumped into the water tank 12 or the washing tub 13. An outlet pipe 172 for releasing water out of the water tank 12 and a drainage valve 171 for controlling the outlet pipe 172 may be provided. Water released through the outlet pipe 172 may be forced out by a drainage pump 173 and released out of the washing machine through the drainage pipe 174.

The washing tub 13 holds laundry, and spins about a vertical axis within the water tank 12. A pulsator 13a is rotatably provided within the washing tub 13.

The washing tub 13 and the pulsator 13a may spin by means of a drive assembly 2. The drive assembly 2 may spin the pulsator 13a only or spin the washing tub 13 and the pulsator 13a simultaneously. The pulsator 13a spins in conjunction with a drive shaft 22 of the drive assembly 2. The washing tub 13 spins in conjunction with a dewatering shaft 25 of the drive assembly 2.

<Drive Assembly>

A drive assembly according to an exemplary embodiment of the present disclosure will be described below with reference to FIGS. 2 to 13B.

The drive assembly 2 spins the pulsator 13a or the washing tub 13. The drive assembly 2 comprises a drive motor 21 that rotates by electromagnetic force, a drive shaft 22 that rotates by the rotation of the drive motor 21 to spin the pulsator, a dewatering shaft 25 that rotates about the same axis as the drive shaft 22 and is connected to the washing tub 13, a solenoid module 27 that generates a magnetic field by applying an electric current to a coil 2712, a coupler 28 whose position is changed when the solenoid module 27 generates a magnetic field, and which axially couples the drive shaft 22 and the dewatering shaft 25 or decouples them from each other depending on the position, and a coupler guider 28 that keeps the drive shaft 22 and the dewatering shaft 25 axially decoupled from each other once they are axially decoupled by the coupler 28.

Here, the axial coupling of the drive shaft 22 and the dewatering shaft 25 means that a plurality of axial coupling teeth 2824a and axial coupling grooves 2824b formed on the bottom of the coupler 28 are configured to mesh with a plurality of tooth grooves 21232c and teeth 21232d on a coupling flange 21232 connected to the drive shaft 22, so that the drive shaft 22 and the dewatering shaft 25 are driven together.

The axial decoupling of the drive shaft 22 and the dewatering shaft 25 means that the bottom of the coupler 28 is spaced a certain distance upward from a coupling flange 21232, so that the drive shaft 22, even if driven by the drive motor 21, does not affect the dewatering shaft 25.

The drive motor 21 may be an outer rotor-type BLDC (brushless direct current) motor. Specifically, the drive motor 21 may comprise a stator 211 with a stator coil 2112 wound around a stator core 2111 and a rotor 211 rotates by an electromagnetic force acting between the rotor 211 and the stator core 211. The rotor 212 may comprise a rotor frame 2122 that fixes a plurality of permanent magnets 2121 spaced apart along the circumference and a rotor hub 2123 that connects the center of the rotor frame 2122 to the drive shaft 22.

The type of the drive motor 21 is not limited to the above one. For example, the drive motor may be an inner rotor, an AC motor such as an induction motor or shaded pole motor, or other various types of well-known motors.

The rotor hub 2123 may comprise a rotor bush 21231 that is attached to the drive shaft 22 and a coupling flange 21232 for attaching the rotor bush 21231 to the center of the rotor frame 2122. The coupling flange 21232 may comprise a tubular flange body 21232a into which the rotor bush 21231 is inserted, and a flange portion 21232b that extends outward from the flange body 21232a and is attached to the rotor frame 2122 by a fastening member such as a screw or bolt. Engaging grooves 21232c and teeth 21232d that mesh with the coupler 28, which will be described later, may intersect on the inner periphery of the flange body 21232a.

The rotor bush 21231 may be made of metal (preferably but not limited to stainless steel). The rotor bush 21231 may be attached to the drive shaft 22; preferably, the inner periphery of the rotor bush 21231 may be attached to the outer periphery of the drive shaft 22 via a spline.

Here, the expression "attached via a spline" means that a spline such as an axially extending tooth or key is formed on either the drive shaft 22 or the rotor bush 21231 and a groove that meshes with the spline is formed on the other, causing the spline and the groove to engage each other. With this engagement, when the rotor bush 21231 rotates, the drive shaft 22 rotates too.

The coupling flange 21232 is made of synthetic resin and interposed between the rotor bush 21231 and the rotor frame 2122, and functions to insulate them to prevent the transmission of magnetic flux from the rotor frame 2122 to the rotor bush 21231.

The coupling flange 21232 is formed by injection-molding synthetic resin, with the rotor bush 21231 being inserted in a mold, thereby forming the rotor bush 21231 and the coupling flange 21232 as a single unit.

The drive shaft 22 rotates in conjunction with the rotor bush 21231. The drive shaft 22 spins the pulsator 13*a* through a pulsator shaft 23. The drive shaft 22 may be connected directly or indirectly to the pulsator shaft 23.

The drive assembly 2 may comprise a pulsator shaft 23 that is connected to the pulsator 13*a* and spins the pulsator 13*a* and a gear module 24 that receives torque from the drive shaft 22 and rotates the pulsator shaft 23 by converting output depending on the speed ratio or torque ratio for the rotation of the drive shaft 22.

In some embodiments, the gear module may be omitted, and the drive shaft 22 may be connected directly to the pulsator 13*a*.

The gear module 24 comprises a sun gear 241 that rotates in conjunction with the drive shaft 22, a plurality of planet gears 242 that mesh with the sun gear 241 and revolve along the outer periphery of the sun gear 241 as they rotate, a ring gear 243 that rotates by meshing with the plurality of planet gears 242, and a carrier 244 that provides an axis of rotation to each of the planet gears 242 and rotates when the plane gears 242.

The sun gear 241 is connected to the drive shaft 22 and rotates in unison with the drive shaft 22. In the exemplary embodiment, the sun gear 241 is a helical gear, and the planet gears 242 and the ring gear 243 are configured to have corresponding helical gear teeth but not limited to them. For example, the sun gear 241 may be a spur gear, and the plane gears 242 and the ring gear 243 may have spur gear teeth.

The ring gear 243 may be fixed to the inner periphery of the gear housing 253. That is, the ring gear 243 rotates in unison with the gear housing 253. The ring gear 243 has teeth on the inner periphery which defines a ring-shaped opening.

The planet gears 242 are interposed between the sun gear 241 and the ring gear 243 and engage the sun gear 241 and the ring gear 243. The plane gears 242 may be arranged around the sun gear 241, and the plane gears 242 are rotatably supported by the carrier 244. The planet gears 242 may be made of acetal resin (POM).

The carrier 244 is coupled (axially coupled) to the pulsator shaft 23. The carrier 244 is a kind of link that connects the planet gears 242 and the pulsator shaft 23. That is, the carrier 244 rotates as the planet gears 242 revolve around the sun gear 241, and therefore the pulsator shaft 23 rotates.

The gear module 24 rotates the pulsator shaft 23 by converting a torque inputted through the drive shaft 22 according to a set gear ratio. The gear ratio may be set depending on the number of teeth in the sun gear 241, planet gears 242, and ring gear 243.

The dewatering shaft 25 comprises a lower dewatering shaft 251 attached to the coupler 28 via a spline to rotate together with the coupler 28, an upper dewatering shaft 252 connected to the washing tub 13 to rotate the washing tub 13, and a gear housing 253 disposed between the lower dewatering shaft 251 and the upper dewatering shaft 252, with the gear module 24 disposed on the inside.

The lower dewatering shaft 251 is disposed above the rotor bush 21231. The lower dewatering shaft 251 may be connected to the drive motor 21 via the coupler 28. When the coupler 28 is axially coupled to the coupling flange 21232, the torque of the drive motor 21 may be transmitted to the dewatering shaft 25.

A drive shaft hole 251*a* through which the drive shaft 22 passes is formed on the inside of the lower dewatering shaft 251. A drive shaft bearing 252 is disposed between the lower dewatering shaft 251 and the drive shaft 22, so that the lower dewatering shaft 251 and the drive shaft 22 may rotate separately.

The outer periphery of the lower dewatering shaft 251 is attached to the inner periphery of the coupler 28 via a spline. The coupler 28, while held back from rotating relative to the lower dewatering shaft 251, may move along the axis of the lower dewatering shaft 251.

A spline structure where the coupler 28 is attached via a spline is formed at a lower portion 2511 of the lower dewatering shaft 251. An upper portion 2512 of the lower dewatering shaft 251 may be made smooth so that the coupler guide 29 is rotatably mounted to it. The coupler guide 29, which will be described below, is mounted around the upper portion 2512 of the lower dewatering shaft 251. The inner circumferential diameter ID2 of the coupler guide 29 is longer than the outer circumferential diameter OD2 of the lower dewatering shaft 251, allowing the coupler guide 29 to be rotatably mounted around the lower dewatering shaft 251.

Incidentally, the coupler guide 29 is restrained from moving downward by means of a stationary ring 293 fixedly disposed on the outer perimeter of the lower dewatering shaft 251, and is restrained from moving upward by means of a dewatering shaft bearing 251 disposed at the upper portion 2512 of the lower dewatering shaft 251 so as to support the lower dewatering shaft 251.

A stationary ring groove 2513 recessed inward along the radius is formed on the outer perimeter of the lower dewatering shaft 251 so that the stationary ring 293 is mounted to it.

The upper dewatering shaft 252 is connected to the washing tub 13, and has a pulsator shaft hole 252*a* formed on the inside through which the pulsator shaft 23 passes. A pulsator shaft bearing 263 is disposed between the upper dewatering shaft 252 and the pulsator shaft 23, allowing the upper dewatering shaft 252 and the pulsator shaft 23 to rotate freely and separately.

The upper dewatering shaft 252 may be made of ferromagnetic material. The upper dewatering shaft 252 may be connected to the washing tub 13 by a hub base 131. The hub base 131 is attached to the bottom of the washing tub 13, and a fastener through which the upper dewatering shaft 252 passes is formed in the center of the hub base 131. The upper dewatering shaft 252 is coupled to the inner periphery of the fastener via a spline, and rotates together with the hub base 131 when the upper dewatering shaft 252 rotates. A nut (not shown) for holding the dewatering shaft 25 in place to prevent its removal from the hub base 131 may be fastened to an upper end 2521 of the upper dewatering shaft 252.

The gear housing 253 forms a space on the inside where the gear module 24 is disposed, and is fastened to the upper dewatering shaft 252 on the upper side and connected to the lower dewatering shaft 251 on the lower side. The gear housing 253 may comprise a lower gear housing 2532 and an upper gear housing 2531.

The lower gear housing 2532 and the upper gear housing 2531 are held together by a fastening member such as a screw or bolt. The lower gear housing 2532 has a hole in the center through which the drive shaft 22 passes, is disk-shaped, and is fastened to the upper gear housing 2531 on the upper side. The lower dewatering shaft 251 extends downward from the lower gear housing 2532, and the lower gear housing 2532 may be formed integrally with the lower dewatering shaft 251.

A boss 25311 attached to the upper dewatering shaft 252 is formed on the upper gear housing 2531, and the upper side of the space where the gear module 24 is contained is opened by the boss 25311. The upper gear housing 2531 comprises a housing body that forms an inner periphery surrounding the ring gear 243 and an upper flange 25113 that extends outward along the radius from the open bottom of the housing body 25312 and is attached to the lower gear housing 253. The boss 25311 extends upward from the housing body 25312.

The drive assembly 2 may further comprise a bearing housing 264 that is disposed under the water tank 12 and supports the dewatering shaft 25.

The bearing housing 264 forms a space on the inside where the dewatering shaft 25 is rotatably disposed. The bearing housing 264 may be attached to the underside of the water tank 12. The bearing housing 264 may be made of ferromagnetic material. The bearing housing 264 comprises an upper bearing housing 2641 attached to the underside of the water tank 12 and a lower bearing housing 2642 attached to the upper bearing housing 2641 on the lower side of the upper bearing housing 2641. The dewatering shaft 25 is disposed in an inner space where the upper bearing housing 2641 and the lower bearing housing 2642 are attached.

A dewatering shaft bearing 261 is disposed between the bearing housing 264 and the dewatering shaft 25 so as to rotatably support the dewatering shaft 25. A first dewatering shaft bearing 261a is disposed between the upper bearing housing 2641 and the upper dewatering shaft 252, and a second dewatering shaft bearing 261b is disposed between the lower bearing housing 2642 and the lower dewatering shaft 251.

The lower bearing housing 2642 comprises a lower insert portion 2643 that projects downward and is inserted into a bearing housing mounting portion 27313 of a solenoid housing 273 to be described later. The lower insert portion 2643 is inserted into the bearing housing mounting portion 27313, so that the bearing housing 264 and the solenoid housing 273 can be easily fastened together.

<Solenoid Module>

The solenoid module 27 forms a magnetic field when an electric current is applied to it, thus moving the coupler 28 upward. The solenoid module 27 may be fixedly disposed under the bearing housing 264. The solenoid module 27 comprises a solenoid 271 that forms a magnetic field when an electric current is applied to it, a fixed core 272 surrounding one side of the perimeter of the solenoid 271, and a solenoid housing 273 that allows the solenoid 271 to be fixedly disposed under the bearing housing 264.

The solenoid housing 273 is fixedly disposed under the bearing housing 264. The solenoid housing 273 may be fixed to the bottom of the bearing housing 264 via a separate fastening member.

The solenoid housing 273 may be roughly disk-shaped and have a dewatering shaft hole 2731a in the center through which the dewatering shaft 25 passes. The inner periphery of the solenoid housing 273 with the dewatering shaft hole 2731a in it is spaced apart from the dewatering shaft 25. The solenoid 271 is fixedly disposed on the inner periphery of the solenoid housing 273.

The solenoid housing 273 may be fixedly disposed on the bearing housing 264, which is disposed above it, via a separate fastening member (not shown). The solenoid housing 273 may comprise an upper solenoid housing 2731 fastened to the bearing housing 264 and a lower solenoid housing 2732 attached to the upper solenoid housing 2731, under the upper solenoid housing 2731.

The upper solenoid housing 2731 comprises a disk-shaped fixed plate 27311 with a dewatering shaft hole 2731a in the center, a bearing housing fastening portion 27312 with a fastening hole (not shown) so as to fasten the fixed plate 27311 to the bearing housing 264, a bearing housing mounting portion 27313 protruding upward, radially spaced a certain distance apart from the inner peripheral edge of the fixed plate 27311, into which the lower insert portion 2643 of the bearing housing 264 is inserted, and a fixed core fixing portion 27314 protruding downward, radially spaced a certain distance apart from the inner peripheral edge of the fixed plate 273a, into which the fixed core 272 is inserted.

The fixed plate 27311 is roughly disk-shaped and has a dewatering shaft hole 2731a in the center through which the dewatering shaft 25 passes. The diameter 2731aD of the dewatering shaft hole 2731a is larger than the diameter of the outer periphery of the dewatering shaft 25 positioned in the dewatering shaft hole 2731a. Accordingly, the dewatering shaft 25 does not interfere with the solenoid housing 273 when it rotates. A space where the coupler 28 and some of the components of a moving core 281 are disposed when the coupler 28 moves upward is formed between the dewatering shaft 25 and the dewatering shaft hole 2731a.

A hook hole 27311b through which a hook 27112a of a bobbin 2711 passes is formed in the fixed plate 27311. The fixed plate 27311 has a fastening hole 27311a fastened to the lower solenoid housing 2732 by a separate fastening means.

The bearing housing mounting portion 27313 protrudes vertically upward from the fixed plate 27311. The bearing housing mounting portion 27313 may have the shape of a ring into which the lower insert portion 2643 of the bearing housing 264 is inserted down. The fixed core fixing portion 27314 protrudes vertically downward from the fixed plate 27311. The fixed core fixing portion 27314 has the shape of a ring into which the fixed core 272 is inserted up. The fixed core 272 is firmly attached and inserted to the inner periphery of the fixed core fixing portion 27314. The lower solenoid housing 2732 is mounted to the outer periphery of the fixed core fixing portion 27314.

The lower solenoid housing 2732 is mounted to the bottom surface of the upper solenoid housing 2731. The lower solenoid housing 2732 may be fastened to the upper solenoid housing 2731 by a separate fastening means (not shown). The lower solenoid housing 2732 has a fastening hole 2732a through which the separate fastening means is inserted.

The lower solenoid housing 2732 comprises a top surface portion 27321 that makes surface contact with the upper solenoid housing 2731, a peripheral portion 27322 protruding vertically downward from the inner peripheral edge of the top surface portion 27321, and a protruding portion 27323 that is vertically bent and protrudes toward the center from the bottom end of the peripheral portion 27322.

The top surface portion 27321 is fastened to the upper solenoid housing 2731 and has a fastening hole 2732a. The peripheral portion 27322 makes surface contact with the outer periphery (외둘레면) of the fixed core fixing portion 27314 of the upper solenoid housing 2731, extends downward, and surrounds the lower periphery (하부돌 레면) of the fixed core 272. The protruding portion 27323 is disposed to support a lower end 27214 of the fixed core 272 and restrains the downward movement of the fixed core 272.

The upper solenoid housing 2731 and the lower solenoid housing 2732 may be configured as a single unit.

The solenoid 271 has a coil wound around the dewatering shaft 25. The solenoid 271 may comprise a bobbin 2711 and a coil 2712 wound around the bobbin 2711. The bobbin 2711 has a hollow through which the dewatering shaft 25 passes, and the coil 2712 is wound around the outer perimeter of the bobbin 2711.

The coil 2712 may be covered with flame retardant resin. The bobbin 2711 may comprise a cylindrical bobbin body portion 2711 around which the coil 2712 is wound, an upper plate portion 27112 extended outward from the upper end of the bobbin body portion 27111, and a lower plate portion 27113 extended outward from the lower end of the bobbin body portion 27111.

The bobbin 2711 comprise a hook 27112a protruding upward from the upper plate portion 27112. The hook 27112a may penetrate through the hook hole 27311b of the solenoid housing 273 and be fixedly disposed in the solenoid housing 273. The hook 27112a may penetrate through a hook hole 2723a formed in the fixed core 272, penetrate through the hook hole 27311b of the solenoid housing 273, and be fixed to the hook hole 27311b of the solenoid housing 273, thus allowing both the solenoid 271 and the fixed core 272 to be fixed to the solenoid housing 273.

The bobbin body portion 27111 may be disposed to make surface contact with the outer periphery of an inner fixed core 2722 of the fixed core 272. The bobbin body portion 27111 may be press-fitted to the outer periphery of the inner fixing core 2722 and fixedly disposed in the fixed core 272.

The upper plate portion 27112 and the lower plate portion 27113 extend radially from the bobbin body portion 2711. The length 27112L to which the upper plate portion 27112 extends radially from the bobbin body portion 27111 is greater than the length 27113L to which the lower plate portion 27113 extends radially from the bobbin body portion 27111.

The fixed core 272 has a structure that surrounds the perimeter of the solenoid 271. The fixed core 272 forms a magnetic path through which a magnetic field generated by the solenoid passes. The fixed core 272 has the shape of a ring which is hollow inside and open at the bottom. The moving core 281 may move to the open bottom of the fixed core 272.

The fixed core 272 comprises an outer fixed core 2721 that forms the outer periphery and is attached to the solenoid housing 273, an inner fixed core 2722 that forms the inner periphery and is attached to the solenoid 271, and a connecting fixed core 2723 that connects the upper ends of the outer fixed core 2721 and inner fixed core 2722.

The outer fixed core 2721 is mounted to the fixed core fixing portion 27314 of the upper solenoid housing 2731 and the peripheral portion 27322 of the lower solenoid housing 2732. The outer fixed core 2721 is disposed to make surface contact with the fixed core fixing portion 27314 of the upper solenoid housing 2731 and the peripheral portion 27322 of the lower solenoid housing 2732. The outer fixed core 2721 comprises an upper outer fixed core 27211 that makes surface contact with the fixed core fixing portion 27314, a lower outer fixed core 27212 that makes surface contact with the peripheral portion 27322 of the lower solenoid housing 2732, and an extended portion 27213 that connects the upper outer fixed core 27211 and the lower outer fixed core 27212. Through the extended portion 27213, the radius of the lower outer fixed core 27212 may be increased, and the lower outer fixed core 27212 may be disposed to make surface contact with the lower solenoid housing 2732.

The lower end 27214 of the outer fixed core 2721 is fixedly disposed by contact with the protruding portion 27323 of the lower solenoid housing 2732.

The inner fixed core 2722 is spaced a certain distance apart from the outer fixed core 2721. A space where the bobbin 2711 is disposed and a space where an outer moving core 2812 is disposed are formed between the inner fixed core 2722 and the outer fixed core 2721.

The inner fixed core 2722 is disposed to abut the bobbin body portion 27111 of the bobbin 2711. The bobbin 2711 is press-fitted to the inner fixed core 2722 and disposed to make surface contact with it.

The connecting fixed core 2723 is disposed to make surface contact with the fixed plate 27311. The connecting fixed core 2723 connects the inner fixed core 2722 and the upper end of the outer fixed core 2721. The connecting fixed core 2723 has a hook hole 2723a through which the hook 27112a penetrates, where the hook 27112a of the bobbin 2711 is formed.

The length 2721L to which the outer fixed core 2721 extends downward from the connecting fixed core 2723 is greater than the length 2722L to which the inner fixed core 2722 extends downward from the connecting fixed core 2723.

<Coupler>

The coupler 28 may be mounted in such a way as to move up and down the lower dewatering shaft 251 and may axially couple or decouple the drive shaft 22 and the dewatering shaft 25. The coupler 28 is provided under the solenoid 271 in such a way as to move up and down the dewatering shaft 25. The coupler 28 may be attached to the lower dewatering shaft 251 via a spline and move up and down the lower dewatering shaft 251.

The coupler 28 comprises a moving core 281 that forms a path of a magnetic flux formed by the solenoid 271 and moves up when an electric current is applied to the solenoid 271, a coupler body 282 that moves up and down the dewatering shaft 25 by the moving core 281 and axially couples or decouples the drive shaft 22 and the dewatering shaft 25, and a guide member 283 that protrudes from the periphery of the coupler body 282 and adjusts the position of the coupler 28.

The moving core 281 is mounted on the outer perimeter of the coupler body 282 and moves the coupler body 282 upward. The moving core 281 may be fixed to the coupler body 282 and move together with the coupler body 282. The moving core 281 moves the coupler body 282 upward when an electric current is applied to the solenoid 271. When there is no electric current applied to the solenoid 271, the coupler body 282 and the moving core 281 move downward by gravity.

The moving core 281 may move up by an electromagnetic interaction with the solenoid 271. The coupler body 282 and the moving core 281 may be formed as a single unit since the coupler body 282 is formed by injection-molding synthetic resin, with the moving core 281 inserted in a mold.

The moving core 281 comprises an inner moving core 2811 that forms the inner periphery and is attached to the coupler body 282, an outer moving core 2812 that forms the outer periphery and is radially spaced a certain distance apart from the inner moving core 2811, and a connecting moving core 2813 that connects the lower ends of the inner moving core 2811 and outer moving core 2812.

The height 2811L to which the inner moving core 2811 extends upward from the connecting moving core 2813 is greater than the height 2812L to which the outer moving core 2812 extends upward from the connecting moving core 2813. The distance 2813 by which the inner moving core 2811 is separated from the outer moving core 2812 is greater than the sum of the thickness of the inner fixed core 2722 and the length 27113L of the lower plate portion 27113 of the bobbin 2711. Accordingly, when the moving core 281 moves upward along the dewatering shaft 25, the bobbin 2711 and the inner fixed core 2722 may be disposed in an inner space formed by the moving core 281.

The diameter 2811OD of the outer periphery of the inner moving core 2811 is smaller than the diameter 2722ID of the inner periphery of the inner fixed core 2722. The diameter 2812D of the ring-shaped outer moving core 2812 is smaller than the diameter 2721D of the outer fixed core 2721 and greater than the diameter 2722D of the inner fixed core 2722.

The coupler body 282 has an overall cylindrical shape, and has a dewatering shaft insert hole 282a in the center through which the dewatering shaft 25 is inserted. The coupler body 282 may; be made of, but not limited to, synthetic resin, and also may be made of metal (for example, ferromagnetic material).

The coupler body 282 further comprises dewatering shaft moving guides 2822a and 2822b that engage the outer perimeter of the dewatering shaft 25 on the inner periphery of the coupler body 282, so as to fix the circumferential movement of the dewatering shaft 25 and allow for the longitudinal movement of the dewatering shaft 25.

As the inner periphery defining the dewatering shaft insert hole 282a is attached via a spline to the outer periphery of the dewatering shaft 25, the dewatering shaft guides 2822a and 2822b may move up and down the dewatering shaft, while the coupler is stopped from rotating relative to the dewatering shaft 25. The dewatering shaft guides 2822a and 2822b may have a plurality of spline teeth 2822a and spline grooves 2822b on the inner periphery of the coupler body 282 which engage the outer periphery of the dewatering shaft 25.

A stopper 2823 with a sloping side that abuts guide projections 292 of the coupler guide 29, which is to be described below, may be formed on the inner periphery 2821 of the coupler body 282. A plurality of stoppers 2823 are disposed along the inner periphery of the coupler body 282.

The stoppers 2823 are disposed over the spline teeth 2822a and spline grooves 2822b formed on the inner periphery 2821 of the coupler body 282.

The stoppers 2823 on the inner periphery 2821 of the coupler body 282 comprise first stoppers 28231 with a sloping surface and second stoppers 28232 disposed on one side of the first stoppers 28231 and made smaller in size and height than the first stoppers 2823.

The first stoppers 28231 and the second stoppers 28232 have a sloping surface which slopes at the same angle. The number of first stoppers 28231 disposed on the inner periphery of the coupler body 282 and the number of second stoppers 28232 disposed on the inner periphery of the coupler body 282 are equal. The first stoppers 2821 and the second stoppers 28232 are alternately disposed on the inner periphery of the coupler body 282. The second stoppers 28232 are disposed on both ends of the first stoppers 28231, and the first stoppers 28231 are disposed on both ends of the second stoppers 28232.

The first stoppers 28231 each comprise a first stopper sloping surface 28231a and a first stopper vertical surface 28231b that is bent and extends downward from the upper end of the first stopper sloping surface 28231a. The second stoppers 28232 each comprise a second stopper sloping surface 28232a and a second stopper vertical surface 28232b that is bent and extends downward from the upper end of the second stopper sloping surface 28232a. The first stopper sloping surface 28231a and second stopper vertical surface 28231b formed on each of the first stoppers 28231 are made longer than the second stopper sloping surface 28232a and second stopper vertical surface 28232b formed on each of the second stoppers 28232. Since the first stoppers 28231 and the second stoppers 28232 have the same angle of slope, the first stoppers 28231 are longer than the second stoppers 28232 and protrude higher than the second stoppers 28232, on the inner periphery of the coupler body 282.

The guide member 283 is disposed on the upper end of the coupler body 282. Opposite ends of the guide member 283 may protrude into the coupler body 282, thus allowing the coupler 28 to sit in locking grooves 29224 of the coupler guide 29.

The guide member 283 has the shape of a semi-circle and comprises a perimeter mounting portion 2831 mounted on the outer perimeter of the coupler body 282 and locking portions 2832a and 2832b that are bent toward the center of the coupler 282 from opposite ends of the perimeter mounting portion 2831 and protrude into the coupler body 282. The locking portions 2832a and 2832b of the guide member 283 may sit in the locking grooves 29224 of the coupler guide 29 when the coupler 28 moves upward, thus fixing the position of the coupler 28 spaced apart from the coupling flange 21232.

The perimeter mounting portion 2831 may have the shape of a semi-ring and be fixedly disposed on the outer perimeter of the coupler body 282. A guide member groove 2825 where the perimeter mounting portion 2831 is mounted is formed on the outer perimeter of the coupler 28.

The locking portions 2832a and 2832b of the guide member 283 may move along guide holes 294 between a plurality of guide projections 292 disposed on the coupler guide 29 or sit in the locking grooves 29224 of the coupler guide 29.

The locking portions 2832a and 2832b are disposed above the first stoppers 28231. The locking portions 2832a and 2832b are disposed above the first stoppers 28231, more adjacent to the lower ends of the first stoppers 28231 than to the upper ends of the first stoppers 28231.

The coupler body 282 comprises torque transmitting portions 2824a and 2824b disposed on the lower ends of the outer periphery of the coupler body 282, for receiving torque from the drive motor 21 when in contact with the drive motor 21.

The torque transmitting portions 2824a and 2824b may have a plurality of axial coupling teeth 2824a and axial coupling grooves 2824b that engage the plurality of tooth grooves 21232c and teeth 21232d of the coupling flange 21232. When the coupler body 282 is axially coupled to the coupling flange 21232, the plurality of axial coupling teeth 2824a and axial coupling grooves 2824b of the coupler body 282 mesh with the tooth grooves 21232c and teeth 21232d of the coupling flange 21232. When the coupler body 282 is axially decoupled from the coupling flange 21232, the plurality of axial coupling teeth 2824a and axial coupling grooves 2824b of the coupler body 282 are spaced a certain distance apart from the tooth grooves 21232c and teeth 21232d of the coupling flange 21232. The coupler body 282 is axially coupled to the coupling flange 21232 when the guide member 283 is disposed under the guide projections 292, and is axially decoupled from the coupling flange 21232 when the guide member 283 is locked in the locking grooves 29224 of the guide projections 292 and fixed in place.

<Coupler Guide>

The coupler guide 29 is rotatably disposed above the dewatering shaft 25 to keep the coupler 28 axially decoupled. The coupler guide 29 is disposed above the spline structure of the lower dewatering shaft 251. The coupler guide 29 is rotatably disposed at approximately a certain height from the dewatering shaft 25.

The upward and downward movement of the coupler guide 29 is restrained by the fixed ring 293 disposed under it and the dewatering shaft bearing 261 disposed over it. The coupler guide 29 rotates when in contact with the guide member 283 or stoppers 2823 of the coupler 28.

The coupler guide 29 comprises a coupler guide body 291 having the shape of a ring and disposed on the outer perimeter of the dewatering shaft 25, and a plurality of guide projections 292 disposed on the outer perimeter of the coupler guide body 291, that rotate the coupler guide body 291 or fix the position of the coupler 28, when in contact with the coupler 28.

The guide projections 292 may come into contact with the stoppers 2823 and restrain the upward movement of the coupler 28, or may come into contact with the guide member 283 to fix the coupler 28 in position once moved upward along the dewatering shaft 25.

The guide projections 292 each comprise a first locking ridge 292a for guiding the locking portions 2832a and 2832b positioned above it to the locking grooves 29224 and a second locking ridge 292b for guiding the locking portions 2832a and 2832b positioned above it to the guide holes 294.

When the locking portions 2832a and 2832b moved upward through the guide holes 294 move up the first locking ridges 292a by the rotation of the coupler guide 29, the first locking ridges 292a guide the downward-moving locking portions 2832a and 2832b to the locking grooves 29224. At this point, the locking portions 2832a and 2832b are locked in the locking grooves 29224, so that the coupler 28 is restrained from moving downward and disposed above the coupling flange 21232.

When the locking portions 2832a and 2832b moved upward through the guide holes 294 move up the second locking ridges 292b by the rotation of the coupler guide 29, the second locking ridges 292b guide the downward-moving locking portions 2832a and 2832b to the guide holes 294. At this point, the locking portions 2832a and 2832b pass through the guide holes 294 and move down the coupler guide 29, and the coupler 28 is disposed to engage the coupling flange 21232.

The guide projections 292 comprise a plurality of guide projections 292 spaced at regular intervals along the outer perimeter of the coupler guide body 291. Guide holes 294 through which the guide member 283 move are formed between the plurality of guide projections 292. The guide holes 294 are formed between first linear guide portions 2923 and second linear guide portions 2924 of the guide projections 292.

The guide projections 292 each comprise a lower surface guide portion 2921 that comes into contact with the stopper 2823 to restrain the upward movement of the coupler 28, an upper surface guide portion 2922 that comes into contact with the guide member 283 to adjust the position of the coupler 28, a first linear guide portion 2923 whose lower end makes contact with the stopper 2823, that connects one end of the lower surface guide portion 2921 and one end of the upper surface guide portion 2922, and a second linear guide portion 2924 which is shorter in length than the first linear guide portion 2923, that connects the other end of the lower surface guide portion 2921 and the other end of the upper surface guide portion 2922.

The lower surface guide portion 2921 has a sloping surface corresponding to the stopper 2823. The stopper 2823 comes into contact with the lower surface guide portion 2921 and moves upward, and is stopped from moving by means of the first linear guide portion 2923, thus restraining the upward movement of the coupler 28.

When the coupler 28 moves upward, the lower surface guide portion 2921 comes into contact with the stopper 2823 to rotate the coupler guide 29. Accordingly, the contact surface of the coupler guide 29 with which the guide member 283 makes contact changes when the coupler 28 moves upward.

The upper surface guide portion 2922 comprises two sloping surfaces which slope in the opposite direction to the lower surface guide portion 2921. The upper surface guide portion 2922 comprises a first sloping surface 29221 which slopes toward the lower surface guide portion 2921 from the first linear guide portion 2923, a connecting linear portion 29223 which is curved upward at an end of the first sloping surface 29221 and extends vertically, and a second sloping surface 29222 which slopes downward from the upper end of the connecting linear portion 29223.

The guide member 283 moves by contact with the first sloping surface 29221 or the second sloping surface 29222, and may be fixed in place between the first sloping surface 29221 and the connecting linear portion 29223. When the guide member 283 moves along the first sloping surface 29221, the movement of the guide member 283 between the first sloping surface 29221 and the connecting linear portion 29223 is restrained. When the guide member 283 moves along the second sloping surface 29222, the guide member 283 penetrates through the guide hole 294 and moves downward.

The angle of slope the first sloping surface 29221 forms with a virtual horizontal line (hereinafter, "the angle of slope of the first sloping surface") is greater than the angle of slope the second sloping surface 29222 forms with a virtual horizontal line (hereinafter, "the angle of slope of the second sloping surface"). Accordingly, the second linear guide portion 2924 is formed between an end of the second sloping surface 29222 and an end of the lower surface guide portion 2921.

The length 2924L to which the second linear guide portion 2924 extends vertically is smaller than the length 2923L to which the first linear guide portion 2923 extends vertically. The length 2924L of the second linear guide portion 2924 may be approximately equal to the length 294L of the guide hole 294. The length 2924L of the second linear guide portion 2924 is 90% to 110% of the distance 294L between the first linear guide portion 2923 and the second linear guide portion 2924 disposed adjacent to first linear guide portion 2923. The length 2924L of the second linear guide portion 2924 is greater than the diameter of the locking portions 2932a and 2932b.

The second linear guide portion 2924 may prevent the coupler guide 29 from rotating backward due to an impact caused when the guide member 283 moving along the lower surface guide portion 2921 comes into contact with the first linear guide portion 2923.

<Operation Mode and Configuration of Coupler Depending on Mode Changes>

A washing machine according to the present disclosure may operate in a first mode M1 in which the drive shaft 22 and the dewatering shaft 25 are axially coupled and both the drive shaft 22 and the dewatering shaft 25 are axially decoupled when the drive motor 21 rotates, and in a second mode M2 in which the drive shaft 22 and the dewatering shaft 25 are axially decoupled and the drive shaft 22 rotates along with the rotation of the drive motor 21.

In the first mode M1, the coupler 28 is in a first position P1 in which the torque transmitting portions 2824a and 2824b engage the plurality of teeth 21232d and tooth grooves 21232c of the coupling flange 21232. The drive shaft 22 and the dewatering shaft 25 are axially coupled when the coupler 28 is in the first position P1. When the coupler 28 is in the first position P1, the coupler 28 transmits the torque of the drive motor 21 to the dewatering shaft 25. When the coupler 28 is in the first position P1, the torque transmitting portions 2824a and 2824b engage the plurality of teeth 21232d and tooth grooves 21232c of the coupling flange 21232.

When the coupler 28 is in the first position P1, the guide member 283 is disposed under the coupler guide 29. When the coupler 28 is in the first position P1, the coupler 28 is fixed in place at the longitudinal lower end of the dewatering shaft 25 by gravity.

In the second mode M2, the coupler 28 is in a second position P2 in which the locking portions 2832a and 2832b of the guide member 283 are disposed on the upper sides of the locking grooves 29224 of the guide projections. When the coupler 28 is in the second position P2, the drive shaft 22 and the dewatering shaft 25 are axially decoupled. When the coupler 28 is in the second position P2, the coupler 28 does not transmit the torque of the drive motor 21 to the dewatering shaft 25. When the coupler 28 is in the second position P2, the torque transmitting portion 2824a and 2824b of the coupler 28 are placed at a distance above the coupling flange 21232.

When the coupler 28 is in the second position P2, the guide member 283 is disposed on the upper sides of the locking grooves 29224 of the coupler guide 29. When the coupler 28 is in the second position P2, the vertical position of the coupler 28 is fixed in a lengthwise direction of the dewatering shaft 25, above the coupler guide 29.

Referring to FIGS. 14A to 15D, the positional movement of the coupler 28 caused by the operation of the solenoid module 27 will be described. FIGS. 14A to 15D illustrate a plan view of guide projections 192a and 192b, locking portions 2832a and 2832b, first stoppers 28231x, 28231y, and 28231z, and second stoppers 28232x, 28232y, and 28232z disposed on an actual cylindrical coupler guide 29 and coupler 28, for convenience of explanation. The guide projections 192a and 192b, first stoppers 28231x, 28231y, and 28231z, and second stoppers 28232x, 28232y, and 28232z illustrated in FIGS. 14A to 15D are identical to the guide projections 192a and 192b, first stoppers 28231x, 28231y, and 28231z, and second stoppers 28232x, 28232y, and 28232z explained with reference to FIGS. 7 to 13B, although they may differ in identification number for ease of explanation.

First of all, referring to FIGS. 14A to 14D, a process in which the coupler 28 changes from the first mode M1 to the second mode M2 by the operation of the solenoid module 27 will be described. That is, a process in which the coupler 28 moves the dewatering shaft 25 and the drive shaft 22 from an axially coupled position to an axially decoupled position by the operation of the solenoid module 27 will be described. This may be a first mode change step subsequent to a mode resetting step, in a control method for the washing machine to be described below.

Figure 14A:
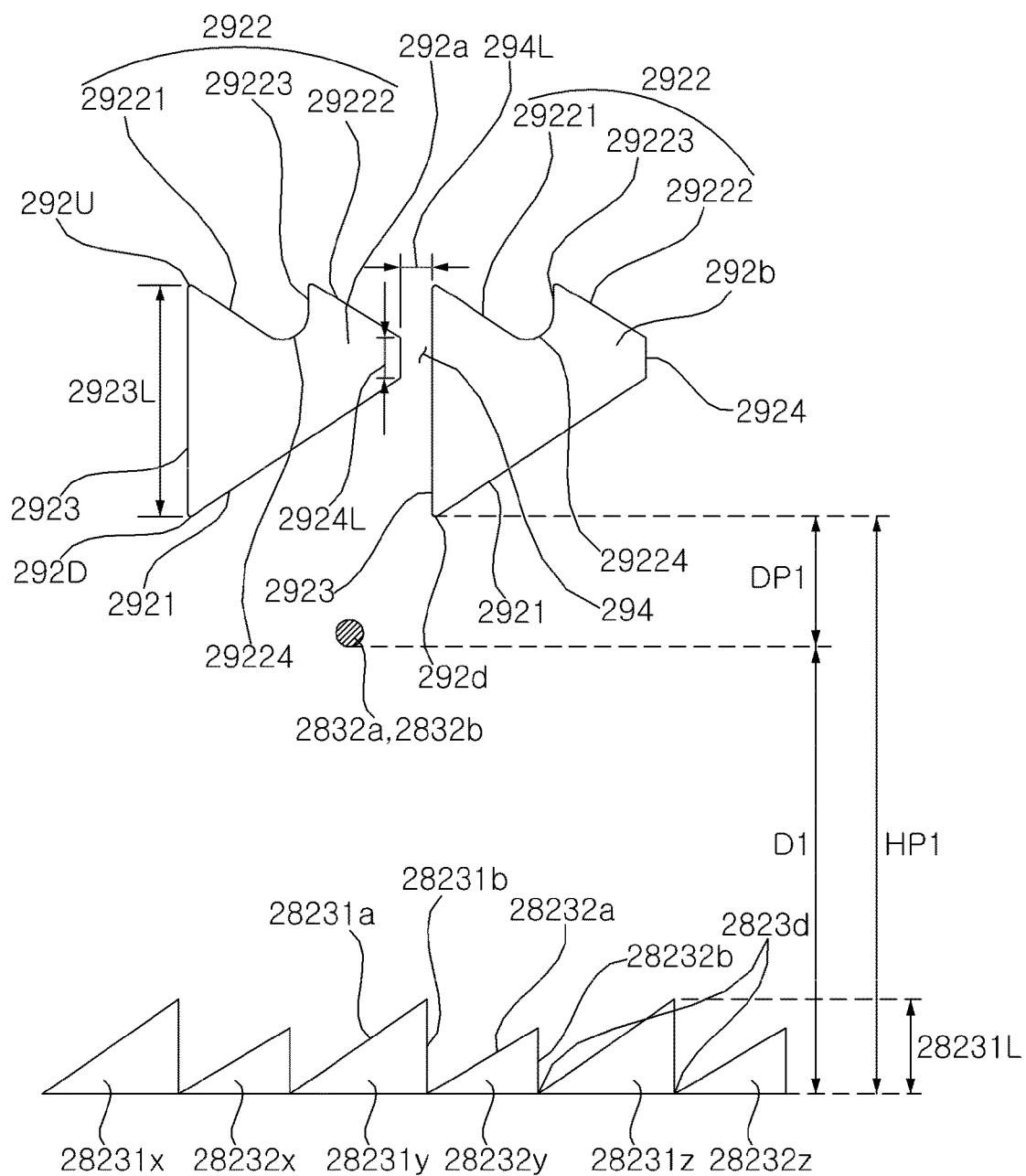
FIGS. 14A to 14D are views for explaining the relationship among stoppers of a coupler, a guide member of the coupler, and guide projections of a coupler guide, from a position where the coupler engages a coupling flange to a position where the coupler is fixed to the upper side of the coupler guide, according to an exemplary embodiment of the present disclosure.

FIG. 14A illustrates how the stoppers 28231x, 28232x, 28231y, 28232y, 28231z, and 28232z, the guide member 283, and the guide projections 292a and 292b are disposed while the coupler 28 is in the first position P1.

The stoppers and the locking portions 2832a and 2832b of the guide member are fixedly disposed on the coupler 28. Thus, the distance D1 between the lower ends 2823d of the stoppers, which are positioned between the first stoppers 28231x, 28231y, and 28231z and the second stoppers 28232x, 28232y, and 28232z, and the locking portions 2832a and 2832b is kept constant.

While the coupler 28 is in the first position P1, the distance HP1 between the lower ends 2823d of the stoppers and the lower ends 292D of the guide projections 292a and 292b is longer than the distance D1 between the lower ends 2823d of the stoppers and the locking portions 2832a and 2832b.

While the coupler 28 is in the first position P, the distance DP1 between the lower ends 292D of the guide projections 292a and 292b and the locking portions 2832a and 2832b is larger than the vertical length 28231L of the first stoppers 28231x, 28231y, and 28231z.

Figure 14B:
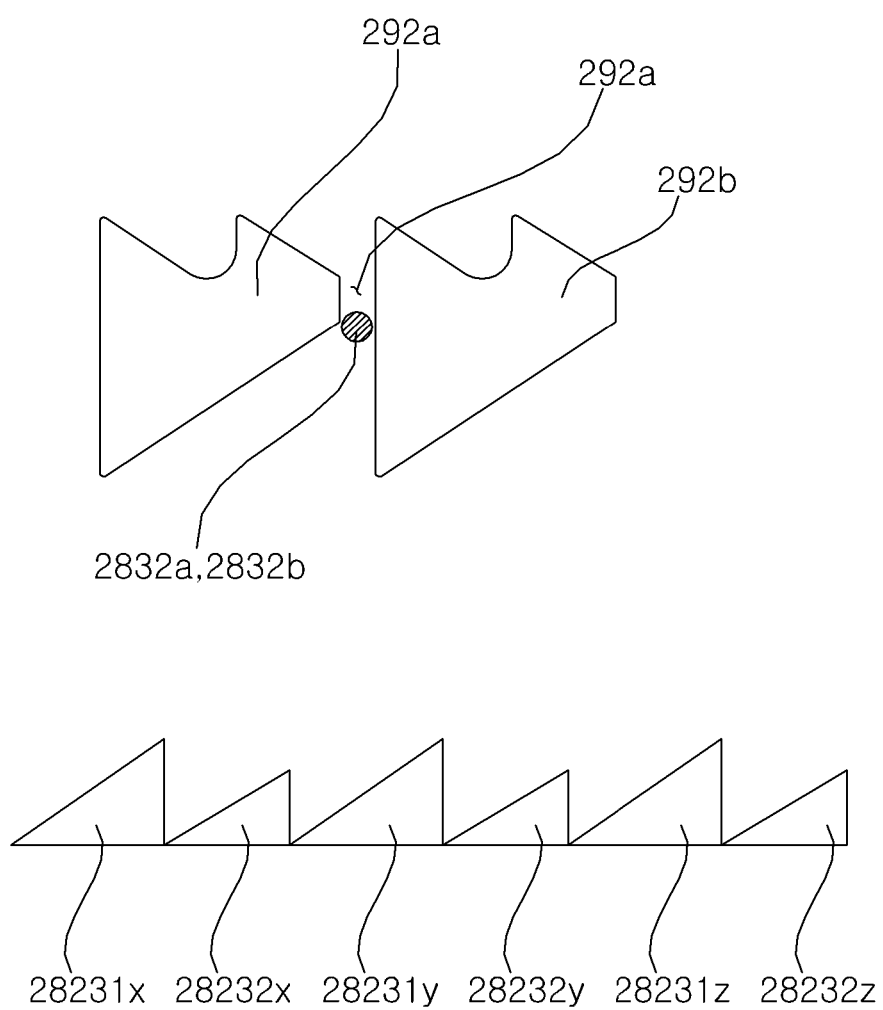
Figure 14C:
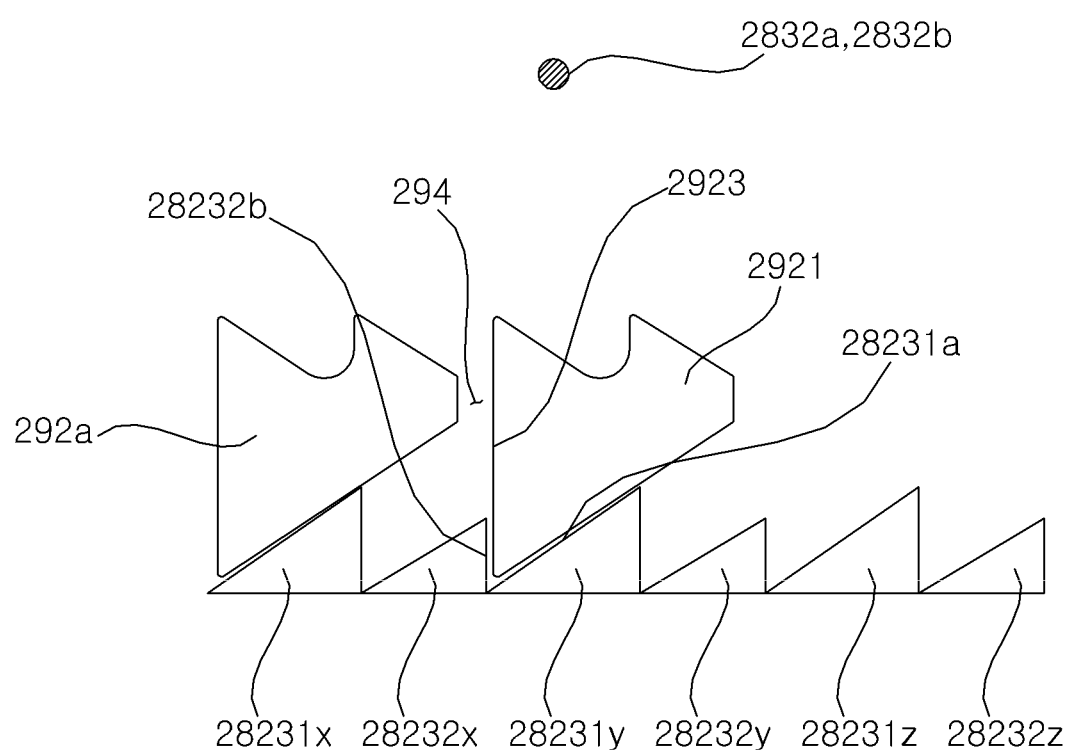
Figure 14D:
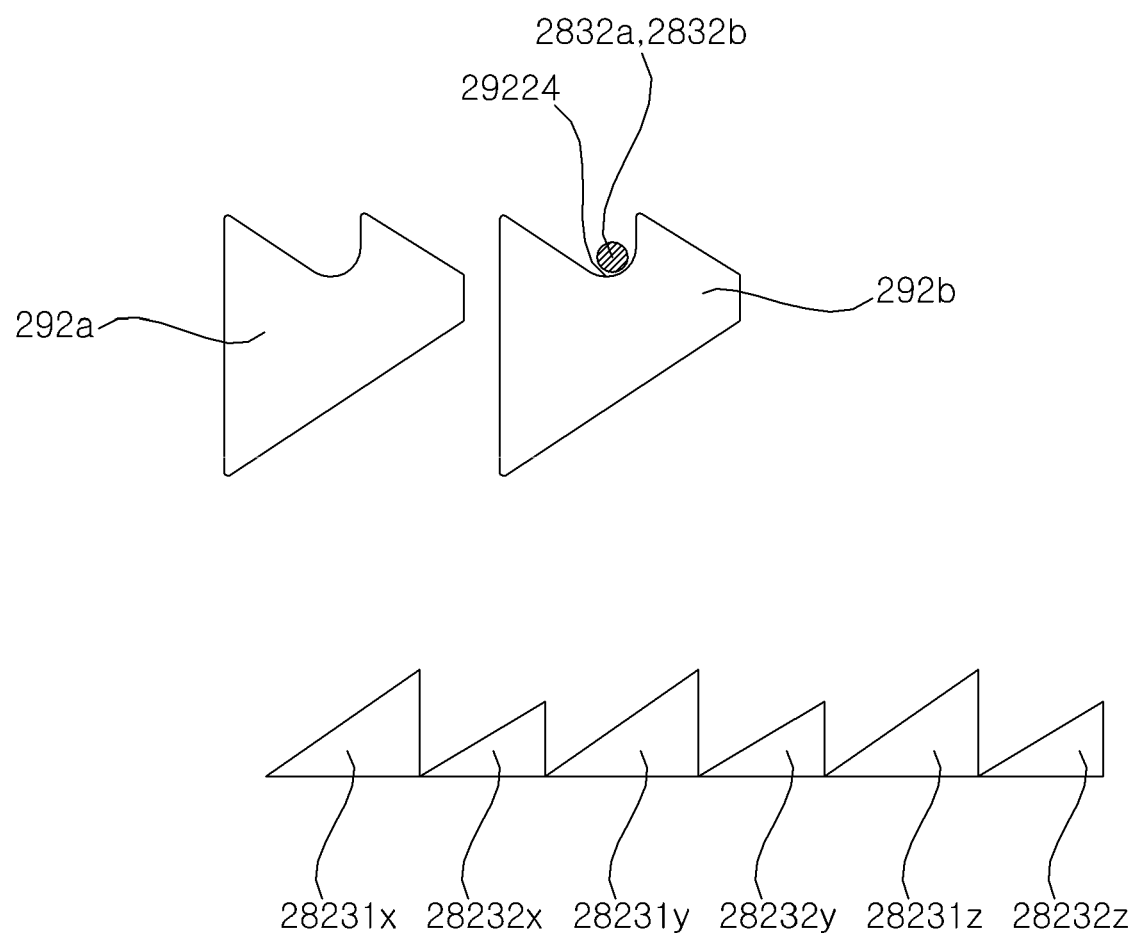

The solenoid module 27 moves the coupler 28 upward when an electric current is applied to the coil 2712 of the solenoid 271. In FIGS. 14A to 14C, the solenoid module 27 pulls the coupler 28 upward. Therefore, in FIGS. 14A to 14C, an electric current is applied to the coil 2712 of the solenoid 271, so that the locking portions 2832a and 2832b of the guide member 283 move upward.

In FIGS. 14A to 14C, when the locking portions 2832a and 2832b move upward, the locking portions 2832a and 2832b come into contact with the lower surface guide portions 2921 and move upward along the guide holes 294. Referring to FIG. 14C, the locking portions 2832a and 2832b move upward until the first stoppers 28231x, 28231y, and 28231z engage the lower surface guide portion 2921. As shown in FIG. 13C, it can be seen that the coupler 28 is in a third position P3, while the first stoppers 28231x, 28231y, and 28231z are in contact with the lower surface guide portion 2921.

The third position P3 of the coupler 28 involves that the coupler guide 29 is rotated as the first stoppers 28231x, 28231y, and 28231z or the second stoppers 28232x, 28232y, and 28232z come into contact with the lower surface guide portions 2921 of the guide projections 292a and 292b. Accordingly, as shown in FIG. 13C or FIG. 14B, the third position P3 of the coupler 28 may comprise the best position where the coupler 28 can move upward as the first stoppers 28231x, 28231y, and 28231z or the second stoppers 28232x, 28232y, and 28232z come into contact the lower surface guide portions 2921 of the guide projections 292a and 292b over a large area. By the way, when the coupler 28 is in a (3–0)th position P3-0, this means that the coupler guide 29 is not rotated since the first stoppers 28231x, 28231y, and 28231z or the second stoppers 28232x, 28232y, and 28232z come into initial contact with the lower surface guide portions 2921 of the guide projections 292a and 292b as the coupler 28 moves upward. The (3–0)th position P3-0 is not included in the third position P3.

In FIGS. 14A to 14C, when the locking portions 2832a and 2832b move upward, they come into contact with the guide projections 292a and 292b to rotate the coupler guide 29 forward. The coupler guide 29 rotates in one direction when in contact with the guide member 283 of the coupler 28 or the stoppers 28231x, 28232x, 28231y, 28232y, 28231y, and 28232z, which is called forward rotation. Rotation in the opposite direction to the forward rotation is defined as the backward rotation of the coupler guide 29.

The locking portions 2832a and 2832b move upward by contact with the lower surface guide portions 2921 to rotate the coupler guide 29 forward. When the locking portions 2832a and 2832b move upward, the locking portions 2832a and 2832b move upward along the sloping surface of the lower surface guide portions 2921, so that the coupler guide 29 rotates forward. The coupler guide 29 rotates forward until the locking portions 2832a and 2832b come into contact with the upper ends of the lower surface guide portions 2921.

The locking portions 2832a and 2832b move upward along the guide holes 294.

When the locking portions 2832a and 2832b move upward along the guide holes 294, the locking portions 2832a and 2832b come into contact with the first linear guide portions 2923 of the guide projections 292a and 292b by means of the rotating coupler guide 29, so that the coupler guide 29 rotates backward. Incidentally, the backward rotation of the coupler guide 29 may be prevented by the second linear guide portions 2924 which are formed upward over a certain length on the upper ends of the lower surface guide portions 2921.

To prevent the backward rotation of the coupler guide 29, the vertical length 2924L of the second linear guide portions 2924L may be equal to or greater than the length 294L of the guide holes 294. To prevent the backward rotation of the coupler guide 29, the vertical length 2924L of the second linear guide portions 2924 may be greater than the cross-section diameter of the locking portions 2832a and 2832b.

Since the second linear guide portions 2924 have a certain length, the guide member 283, moved by the coupler guide 29 rotating backward, comes into contact with the second linear guide portions 2924, thereby preventing the backward rotation of the coupler guide 29.

When the locking portions 2832a and 2832b move upward through the guide holes 294, the first stoppers 28231x, 28231y, and 28231z of the coupler 28 come into contact with the lower surface guide portions 2921. The locking portions 2832a and 2832b are disposed above the first stoppers 28231x, 28231y, and 28231z. The locking portions 2832a and 2832b are disposed above the first stoppers 28231x, 28231y, and 28231z, adjacent to the lower ends of the first stoppers 28231x, 28231y, and 28231z. That is, the locking portions 2832a and 2832b are disposed above the first stoppers 28231x, 28231y, and 28231z, much closer to the lower ends of the first stoppers 28231x, 28231y, and 28231z relative to the center of the first stoppers 28231x, 28231y, and 28231z.

With this structure, when the locking portions 2832a and 2832b, once passed through the guide holes 294, move upward, the coupler guide 29 may be stopped from moving, or, even if it partially rotates backward, the first stoppers 28231x, 28231y, and 28231z and the lower surface guide portions 2921 may make contact with each other.

When the locking portions 2832a and 2832b move upward, the first stopper sloping surfaces 28231a of the first stoppers 28231x, 28231y, and 28231z and the sloping surfaces of the lower surface guide portions 2921 make contact with each other, allowing the coupler guide 29 to rotate forward. The coupler guide 29 rotates forward until the first linear guide portions 2923 of the guide projections 292a and 292b come into contact with the second stopper vertical surfaces 28232b of the second stoppers 28232x, 28232y, and 28232z. The locking portions 2832a and 2832b move upward until the first linear guide portions 2923 of the guide projections 292a and 292b come into contact with the second stopper vertical surfaces 28232b of the second stoppers 28232x, 28232y, and 28232z.

Once the locking portions 2832a and 2832b are moved upward until the first linear guide portions 2923 of the guide projections 292a and 292b come into contact with the second stopper vertical surfaces 28232b of the second stoppers 28232x, 28232y, and 28232z, the locking portions 2832a and 2832b are disposed over the first slopping surfaces 29221 of the guide projections 292a and 292b.

Accordingly, when the force of the solenoid module 27 applied to pull the coupler 28 upward is released, the coupler 28 moves downward by gravity, and the locking portions 2832a and 2832b move to the locking grooves 29224 of the upper surface guide portions 2922 of the guide projections 292a and 292b. That is, the locking portions 2832a and 2832b move downward by contact with the first sloping surfaces 29221 of the upper surface guide portions 2922. At this point, the load of the locking portions 2832a and 2832b acting downward on the first sloping surfaces 29221 causes the coupler guide 29 to rotate forward. The coupler guide 29 rotates forward until the locking portions 2832a and 2832b are placed in the locking grooves 29224. When the locking portions 2832a and 2832b are positioned in the locking grooves 29224 of the guide projections 292a and 292b, the position of the coupler 28 may be fixed. In this instance, even if there is no electric current applied to the solenoid module 27, the coupler 28 may be placed at a certain distance above the coupling flange 21232.

Hereinafter, referring to FIGS. 15A to 15D, a process in which the coupler 28 changes from the second mode M2 to the first mode M1 by the operation of the solenoid module 27 will be described. That is, a process in which the coupler 28 moves the dewatering shaft 25 and the drive shaft 22 from an axially coupled position to an axially decoupled position by the operation of the solenoid module 27 will be described. This may be a second mode change step which is carried out after the first mode change step, in a control method for the washing machine to be described below.

Figure 15A:
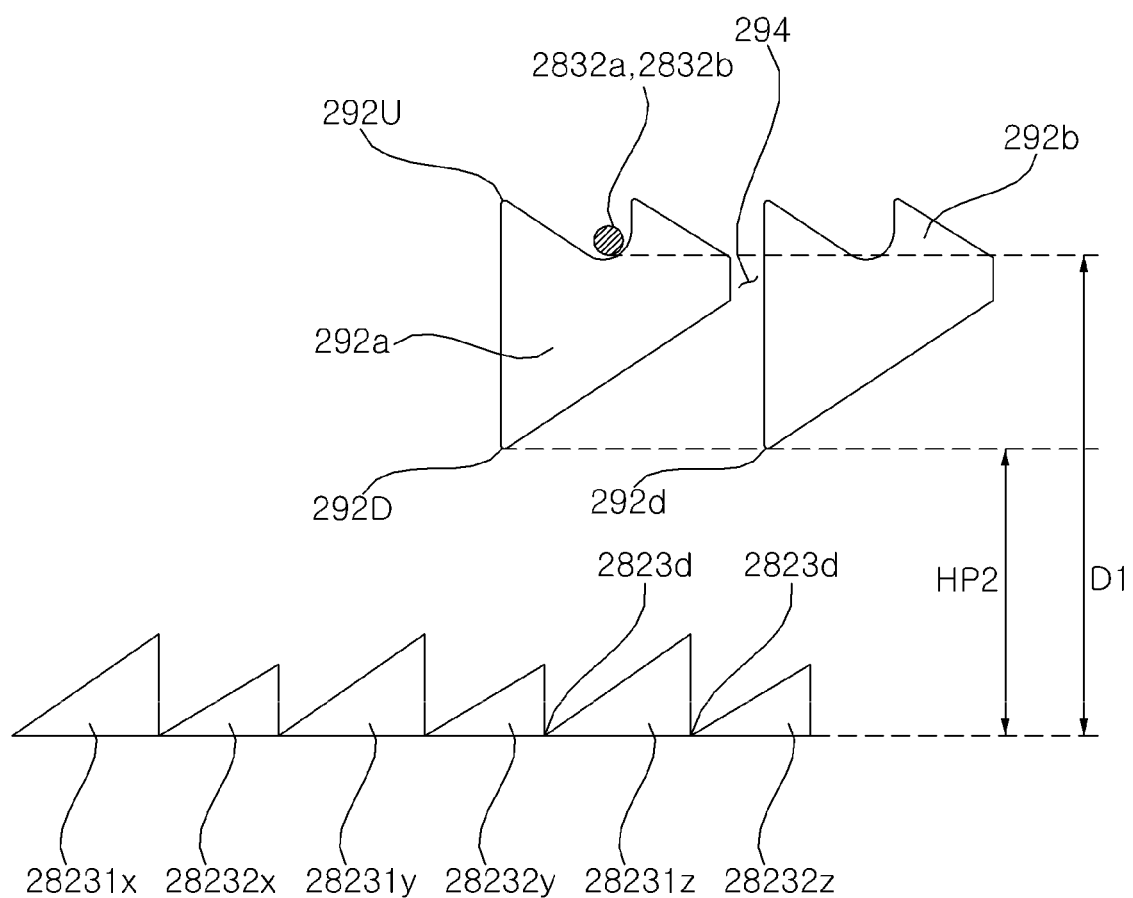
FIGS. 15A to 15D are views for explaining the relationship among stoppers of a coupler, a guide member of the coupler, and guide projections of a coupler guide, from a position where the coupler is fixed to the upper side of the coupler guide to a position where the coupler engages a coupling flange, according to an exemplary embodiment of the present disclosure.
Figure 15B:
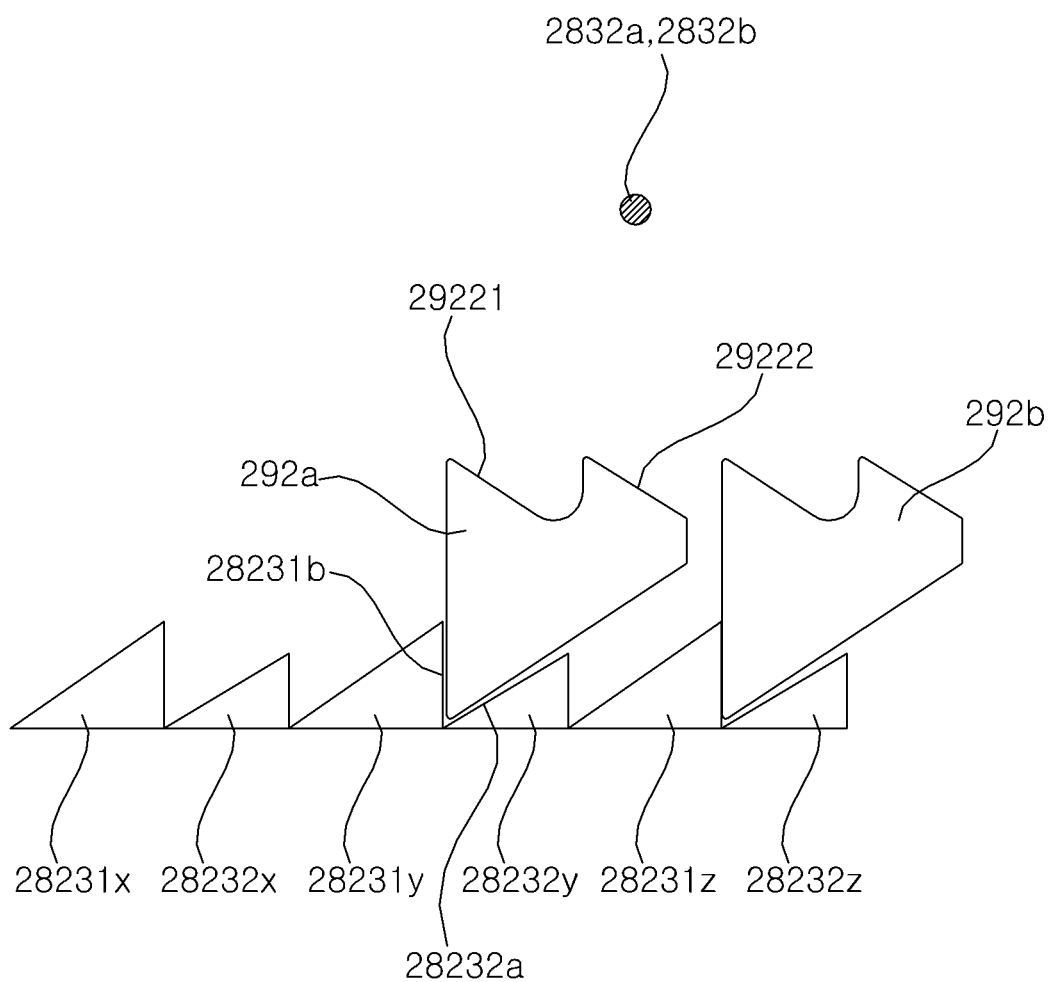
Figure 15C:
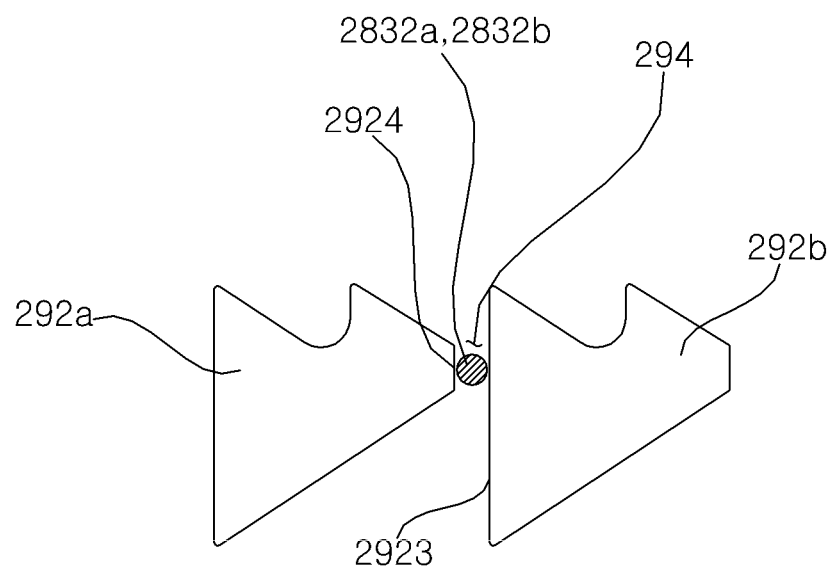
Figure 15C:
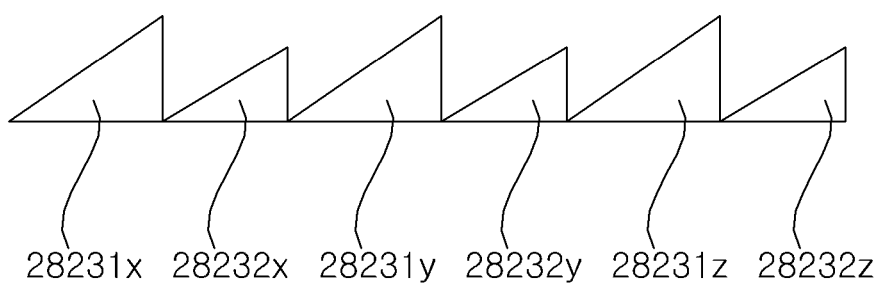
Figure 15D:
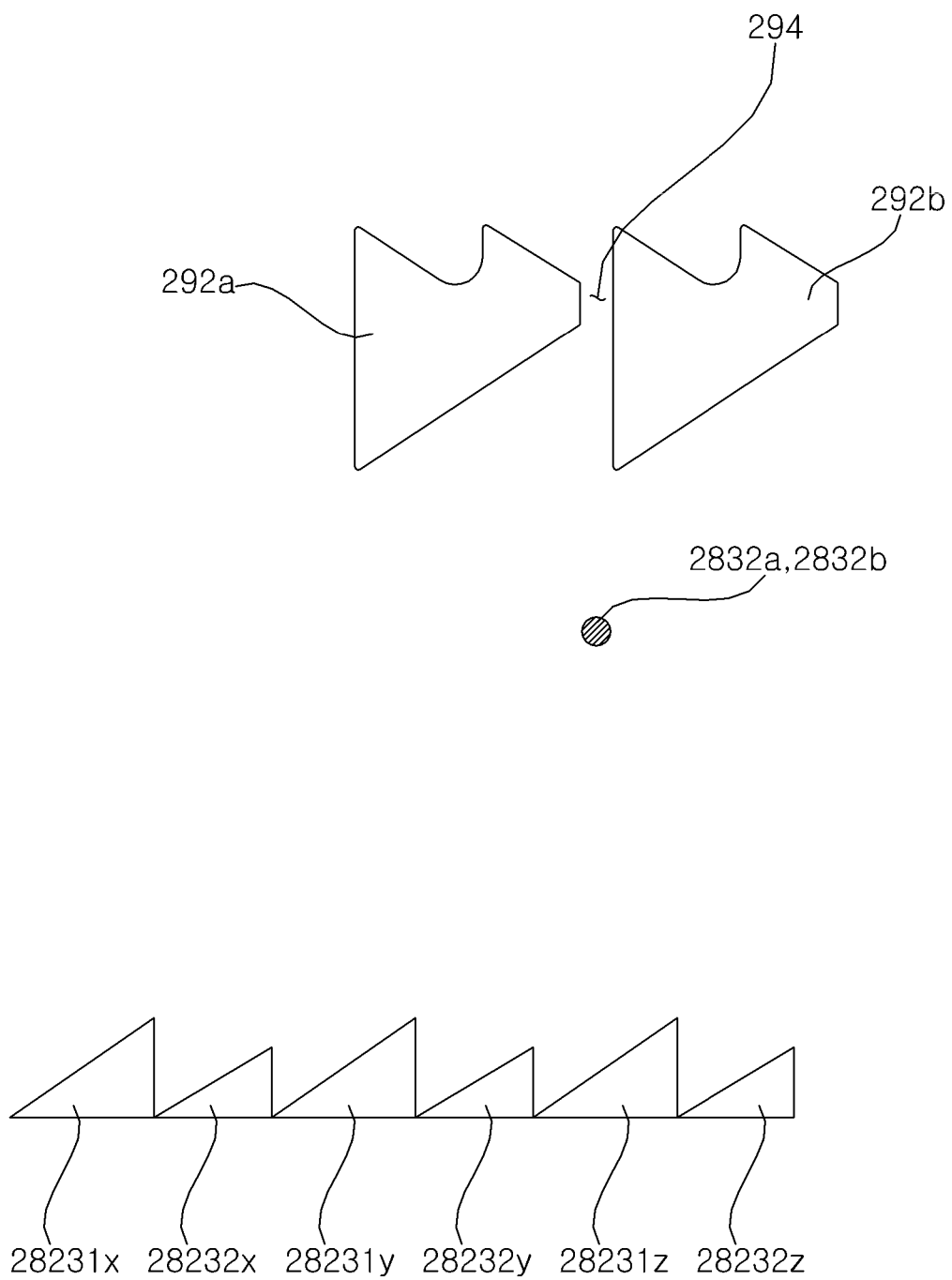

FIG. 15A illustrates how the stoppers 28231x, 28232x, 28231y, 28232y, 28231z, and 28232z, the guide member 283, and the guide projections 292a and 292b are disposed while the coupler 28 is in the second position P2.

While the coupler 28 is in the second position P2, the distance HP2 between the lower ends 2823d of the stoppers and the lower ends 292D of the guide projections 292a and 292b is longer than the distance D1 between the lower ends 2823d of the stoppers and the locking portions 2832a and 2832b.

The solenoid module 27 moves the coupler 28 upward when an electric current is applied to the coil 2712 of the solenoid 271. In FIGS. 14A and 14B, the solenoid module 27 pulls the coupler 28 upward. Therefore, in FIGS. 14A and 14B, an electric current is applied to the coil 2712 of the solenoid 271, so that the locking portions 2832a and 2832b of the guide member 283 move upward.

The locking portions 2832a and 2832b move upward from the locking grooves 29224. When the locking portions 2832a and 2832b move upward, the second stopper sloping surfaces 28232a of the second stoppers 28232x, 28232y, and 28232z and the sloping surfaces of the lower surface guide portions 2921 make contact with each other, allowing the coupler guide 29 to rotate forward. The coupler guide 29 rotates forward until the first linear guide portions 2923 of the guide projections 292a and 292b come into contact with the first stopper vertical surfaces 28231b of the first stoppers 28231x, 28231y, and 28231z. The locking portions 2832a and 2832b move upward until the first linear guide portions 2923 of the guide projections 292a and 292b come into contact with the first stopper vertical surfaces 28231b of the first stoppers 28231x, 28231y, and 28231z.

Once the locking portions 2832a and 2832b are moved upward until the first linear guide portions 2923 of the guide projections 292a and 292b come into contact with the first stopper vertical surfaces 28231b of the first stoppers 28231x, 28231y, and 28231z, the locking portions 2832a and 2832b are disposed over the second slopping surfaces 29222 of the guide projections 292a and 292b.

When the force of the solenoid module 27 applied to pull the coupler 28 upward is released, the coupler 28 moves downward by gravity, and the locking portions 2832a and 2832b move to the guide holes 294 formed between the plurality of guide projections 292a and 292b. That is, the locking portions 2832a and 2832b move downward by contact with the second sloping surfaces 29222 of the upper surface guide portions 2922. At this point, the load of the locking portions 2832a and 2832b acting downward on the second sloping surfaces 29222 causes the coupler guide 29 to rotate forward. The coupler guide 29 rotates forward until the locking portions 2832a and 2832b are moved to the guide holes 294.

As the locking portions 2832a and 2832b move to the lower side of the coupler guide 29 along the guide holes 294, the coupler 28 moves downward. The coupler 28 moves downward until it reaches the first position P1 of the coupler 28.

Along with the downward movement of the coupler 28, the torque transmitting portions 2824a and 2824b of the coupler 28 are disposed to engage the coupling flange 21232. At this point, the coupler 28 becomes capable of transmitting the torque of the drive motor 21 to the dewatering shaft 25.

<Controller and Related Components>

Figure 16:
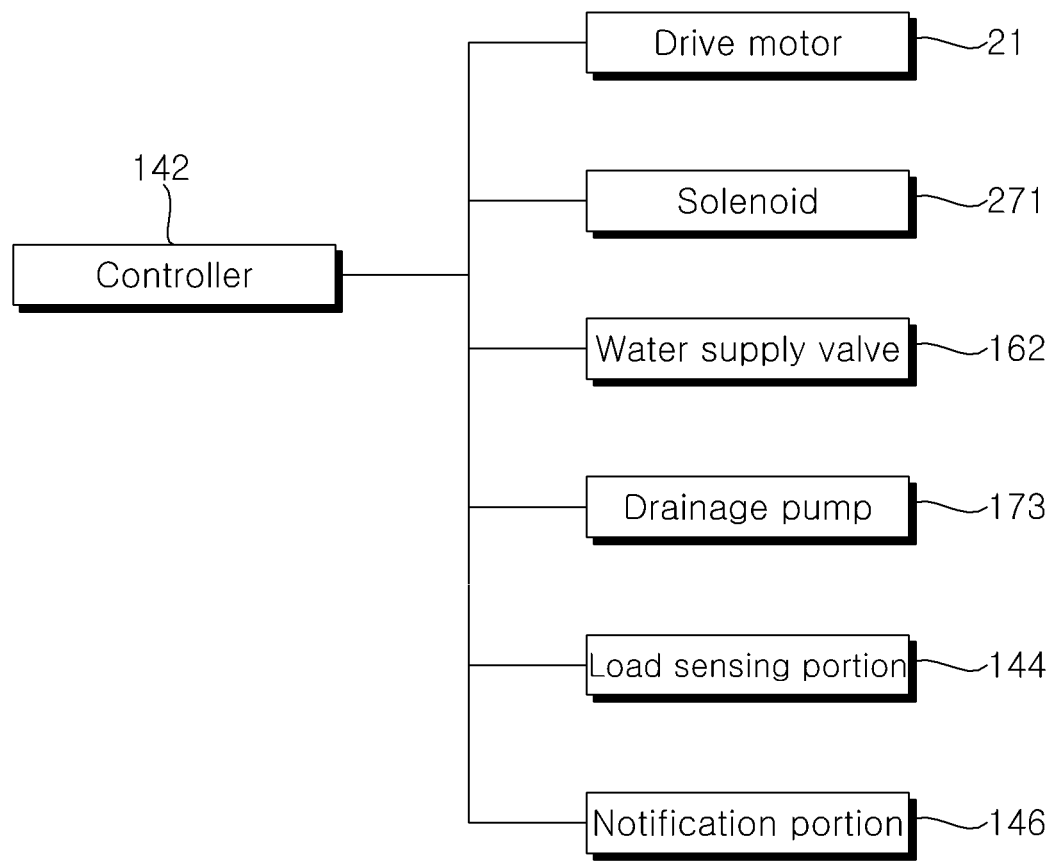
FIG. 16 is a block diagram illustrating a controller and its related components according to an exemplary embodiment of the present disclosure.
Figure 17:
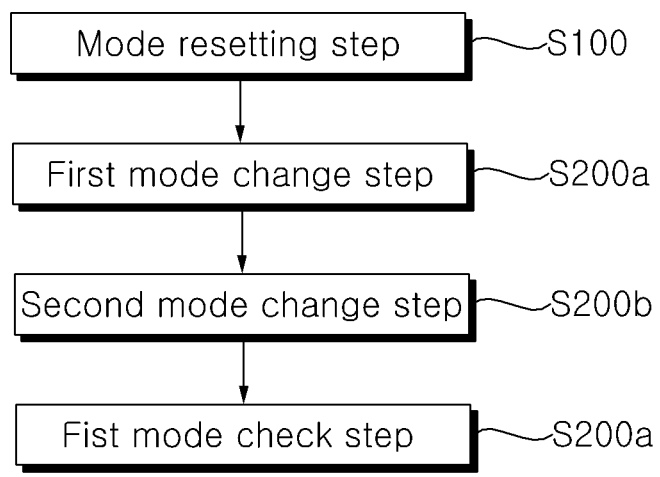
FIG. 17 is a sequential diagram illustrating a control method for a washing machine according to an exemplary embodiment of the present disclosure.

Hereinafter, a controller 142 for controlling the operation of a washing machine according to the present disclosure and its related components will be described with reference to FIG. 16.

The washing machine according to the present disclosure comprises a controller 142 that controls the drive motor 21 to make it rotate or to form a magnetic field in the solenoid module 27.

The controller 142 may allow the drive motor 21 to generate torque by applying an electric current to the drive motor 21. When the drive motor 21 rotates by means of the controller 142, the drive shaft 22 connected to the rotor bush 21231 rotates too. When the drive motor 21 rotates by means of the controller 142, the dewatering shaft 25 may be selectively rotated. When the drive motor 21 rotates, with the coupler 28 engaging the coupling flange 21232, the dewatering shaft 25 rotates together with the drive motor 21. However, while the coupler 28 is separated from the coupling flange 21232, only the drive shaft 22 rotates but the dewatering shaft 25 when the drive motor 21 rotates.

The controller 142 may make the drive motor 21 operate to perform a washing stroke or dewatering stroke. The washing stroke refers to a stroke in which the coupler 28 axially decouples the drive shaft 22 and the dewatering shaft 25 so that only the drive shaft 22 rotates by the operation of the drive motor 21, making the pulsator 13a spin. The dewatering stroke refers to a stroke in which the coupler 28 axially couples the drive shaft 22 and the dewatering shaft 25 so that both the drive shaft 22 and the dewatering shaft 25 rotate by the operation of the drive motor 21, making both the pulsator 13a and the washing tub 13 spin.

A washing machine according to the present disclosure may further comprise a load sensing portion 144 for sensing the load of current flowing to the drive motor 21. The controller 142 may sense errors in the washing stroke and the dewatering stroke based on the load of current sensed by the load sensing portion 144.

In the washing stroke, only the pulsator 13a rotates by the operation of the drive motor 21, and, in the dewatering stroke, both the pulsator 13a and the washing tub 13 rotate together by the operation of the drive motor 21. The load sensed by the load sensing portion during the dewatering stroke is larger than that during the washing stroke.

Figure 20:
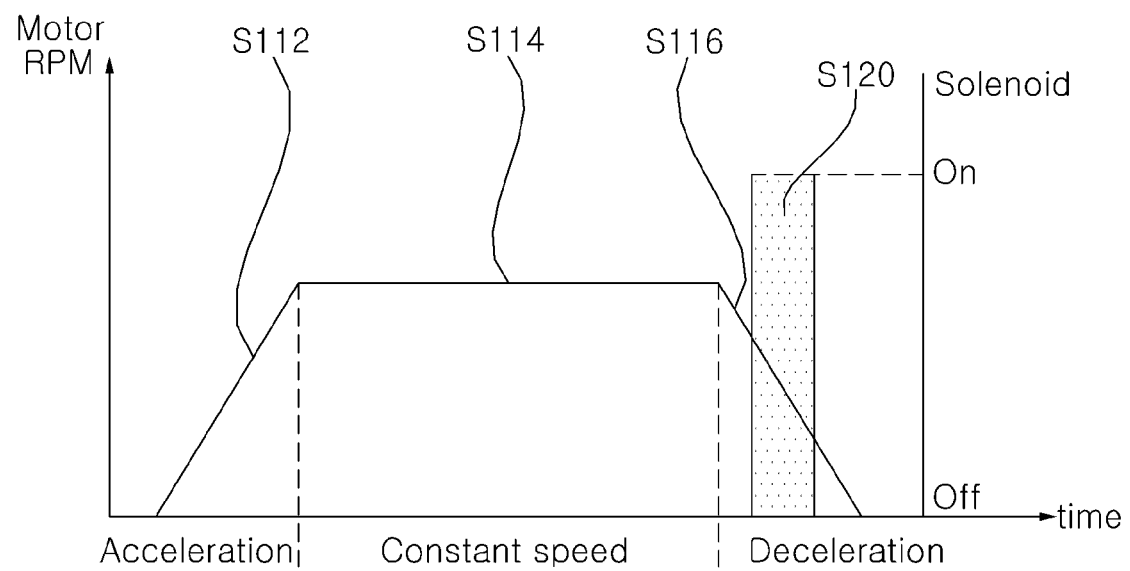
FIG. 20 is a view showing in detail a timetable of the mode resetting step according to another exemplary embodiment of the present disclosure.
Figure 21:
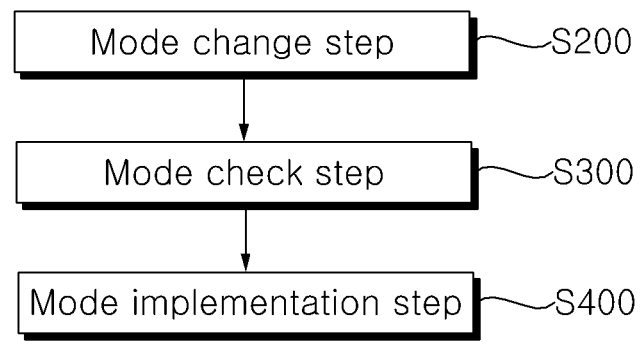
FIG. 21 is a sequential chart illustrating a control method for a washing machine for error detection according to an exemplary embodiment of the present disclosure.
Figure 22:
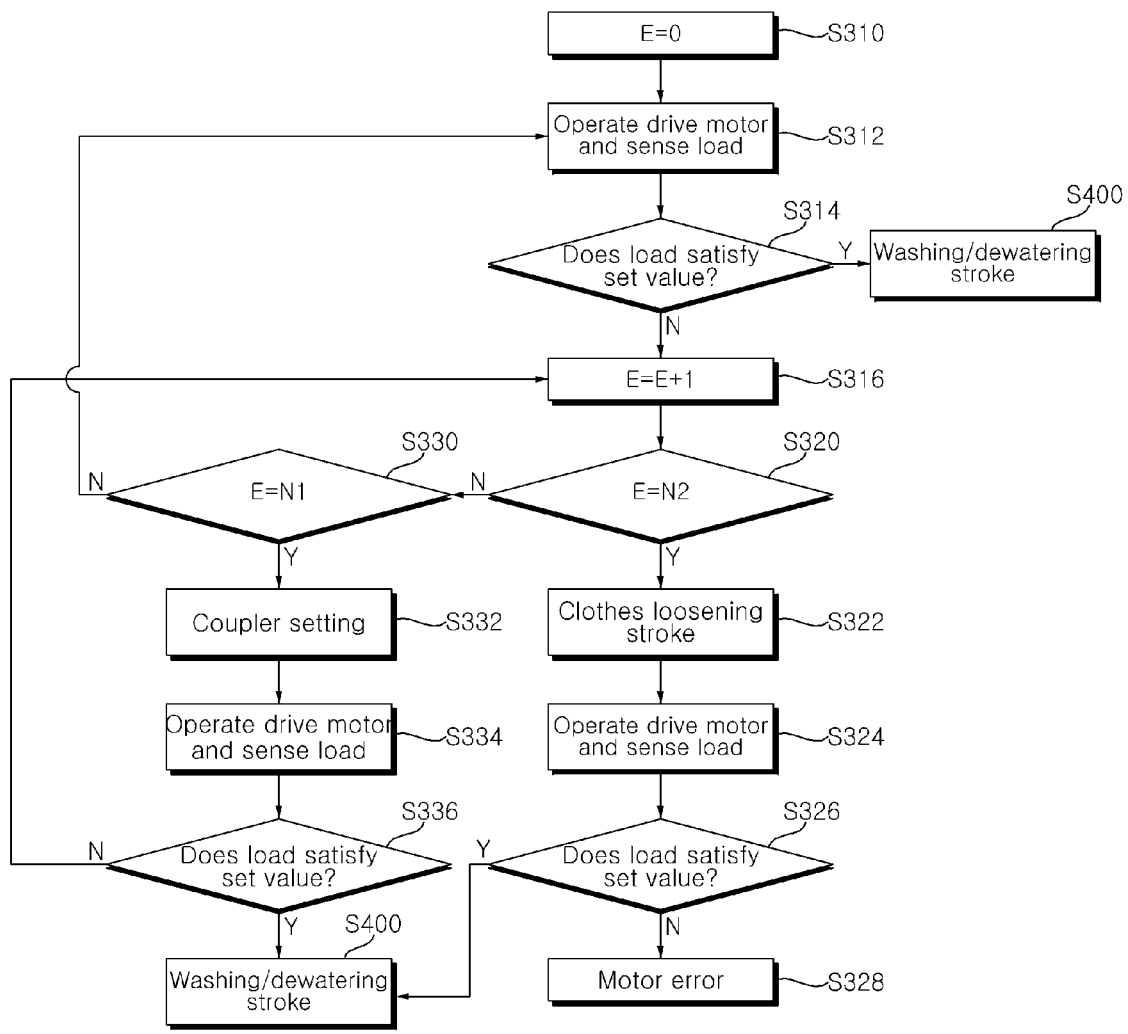
FIG. 22 is a sequential chart showing in detail a mode check step according to an exemplary embodiment of the present disclosure.

The controller 142 may rotate the drive shaft 122 by operating the drive motor 21. As shown in FIG. 20, the controller 142 may make the drive motor 21 operate such that the drive shaft 22 rotates at accelerating speed, constant speed, or decelerating speed.

In the first mode M1, when the drive motor 21 operates, the coupler 28 engaging the coupling flange 21232 rotates together. That is, when the controller 142 makes the drive motor 21 operate to rotate the drive shaft 22 at accelerating speed, constant speed, or decelerating speed. On the other hand, in the second mode M2, the coupler 29 does not rotate when the drive motor 21 operates.

The controller 142 may operate the solenoid module 27 to move the coupler 28 from the first position P1 to the second position P2 or move the coupler 28 from the second position P2 to the first position P1. Also, the controller 142 may operate the solenoid module 27 to keep the coupler 28 in the first position P1 or move the coupler 28 from the second position P2 to the first position P1.

The controller 142 makes the solenoid module 27 operate to move the coupler 28 from the second position P2 to a position where the coupler 28 makes contact with the coupler guide 29 and move the coupler 28 from the first position P1 to a position where the coupler 28 does not make contact with the coupler guide 29.

The controller 142 makes the solenoid module 27 operate to move the coupler 28 within a range where the coupler guide 29 does not rotate when the locking portions 2832a and 2832b move up the dewatering shaft along the guide holes 294 and in a range where the coupler guide 29 rotates when the locking portions 2832a and 2832b move up the locking grooves 29224. Here, the range where the coupler guide 29 does not rotate refers to a range where the coupler guide 29 does not rotate by contact between the lower surface guide portions 2921 of the guide projections 292 and the stoppers 2823 of the coupler 28, which may mean the height up to which there is no contact between the lower surface guide portions 2921 of the guide projections 292 and the stoppers 2823 of the coupler 28. Also, the range where the coupler guide 29 rotates refers to a range where the coupler guide 29 rotates by contact between the lower surface guide portions 2921 of the guide projections 292 and the stoppers 2823 of the coupler 28. That is, within a range where the coupler guide 29 rotates, the coupler 28 moves upward while there is contact between the lower surface guide portions 2921 of the guide projections 292 and the stoppers 2823 of the coupler 28, thus causing the coupler guide 29 to rotate.

The controller 142 may operate the solenoid module 27 when the drive motor 21 operates. The controller 142 may operate the solenoid module 27 when the drive shaft 22 rotates at accelerating speed, constant speed, or decelerating speed. Preferably, the controller 142 may operate the solenoid module 27 when the drive shaft 22 rotates at a decreasing speed.

By operating the solenoid module 27 when the drive motor 21 operates, the coupler 29 in the first position P1 is restrained from moving upward. In the first position P1, the coupler 28 is disposed to engage the coupling flange 21232. Accordingly, while the drive motor 21 is operating, the coupler 28 in the first position keeps rotating together with the drive shaft 22. Thus, the coupler 28 is restrained from moving upward even when the solenoid module 27 operates. Moreover, if the drive shaft 22 accelerates or decelerates by the operation of the drive motor 21, the upward movement of the coupler 28 is restrained due to frictional noise generated from the contact surface between the coupling flange 21232 and the coupler 28.

On the other hand, the coupler in the second position P2 may move upward regardless of the operation of the drive motor 21 when the solenoid module 27 operates. Accordingly, even when the drive motor 21 operates, the coupler in the second position P2 may move to the first position P1 as long as the solenoid module 27 operates.

Moreover, the controller 142 may regulate the water supply valve 162 or regulate the operation of the drainage pump 173.

<Control Method>

Hereinafter, a control method for a washing machine according to the present disclosure will be described with reference to FIGS. 12A to 20.

In the control method for the washing machine according to the present disclosure, a mode resetting step S100 is performed to adjust the configuration of the coupler 28 by the operation of the solenoid module 27 so that the coupler 28 in the first position P1 or second position P2 is kept in the first position P1 or moved to the first position P1. That is, the mode resetting step S100 is a step of adjusting the configuration of the coupler 28 to place it into the first mode M1. Afterwards, a first mode change step S200a is performed to move the coupler 28 from the first position P1 of the first mode M1 to the second position P2 of the second mode M2 by the operation of the solenoid module 27. Afterwards, a second mode change step S200b is performed to move the coupler 28 from the second position P2 of the secondi mode M2 to the first position P1 of the first mode M1 by the operation of the solenoid module 27.

Hereinafter, the mode resetting step S100 will be explained in various ways.

First of all, the mode resetting step S100 according to a first exemplary embodiment will be described with reference to FIGS. 12A to 18. In the mode resetting step S100, the coupler 28 is moved upward by applying an electric current to a coil of the solenoid 27, so that the coupler 28 in the first mode M1 or in the second mode M2 moves down the coupler guide 29 along the guide holes 294 formed in the coupler guide 29.

In the mode resetting step S100, the controller 142 makes the solenoid module 27 operate in such a way that the coupler 28 in the first position P1 moves as high as or less than the distance H3 between the first position P1 and the second position P2. In the mode resetting step S100, the controller 142 makes the solenoid module 27 operate in such a way that the coupler 28 in the first position P1 moves less than the distance H1 between the first position p1 and the third position P3. The controller 142 makes the solenoid module 27 operate in such a way that the coupler 28 in the second position P2 moves as high as or greater than the distance H2 between the second position P2 and the third position P3.

In the mode resetting step S100, the controller 142 operates the solenoid module 27 such that the coupler 28 moves within a range where there is no contact between the first stoppers 28231 and the lower surface guide portions 2921 of the guide projections 292 when the coupler in the first position P1 moves upward. In the mode resetting step S100, the controller 142 moves the coupler 28 by operating the solenoid module 27 within a range where the coupler guide 29 rotates by contact between the second stoppers 28232 and the lower surface guide portions 2921 of the guide projections 292 when the coupler 28 in the second position P2 moves upward.

Through the mode resetting step S100, the first mode M1 where the coupler 28 is in the first position P1 is maintained. Through the mode resetting step S100, the coupler 28 in the second position P2 changes from the second mode M2 to the first mode M1 to move to the first position P1.

Referring to FIGS. 13A to 13C and FIGS. 14A and 14B, the distance H1 of upward movement of the coupler 28 in the first mode change step in which the coupler 28 changes from the first mode M1 to the second mode M2 is greater than the distance H2 of upward movement of the coupler 28 in the second mode change step S200b in which the coupler 28 changes from the second mode M2 to the first mode M1.

Accordingly, there may be a difference between the time T1 taken to move the coupler 28 upward in the first mode change step S200a and the time T2 taken to move the coupler 28 upward in the second mode change step S200b. That is, the time T1 taken to move the coupler 28 upward in the first mode change step S200a is longer than the time T2 taken to move the coupler 28 upward in the second mode change step S200b.

In the mode resetting step S100, it takes a shorter time to operate the solenoid module 27 than the time T1 taken to move the coupler 28 upward in the first mode change step S200a. In the mode resetting step S100, it takes the same amount of time or longer to operate the solenoid module 27 than the time T2 taken to move the coupler 28 upward in the second mode change step S200b. Specifically, the time for electric current application to the coil 2712 of the solenoid 271 in the mode resetting step S100 is somewhere between the minimum time T1 for electric current application to the coil 2712 in the first mode change step S200a and the minimum time T2 for electric current application to the coil 2712 in the second mode change step S200b.

Therefore, in the mode resetting step S100, the second mode change step S200b may be implemented, whereas the first mode change step S200a is not implemented.

Figure 19:
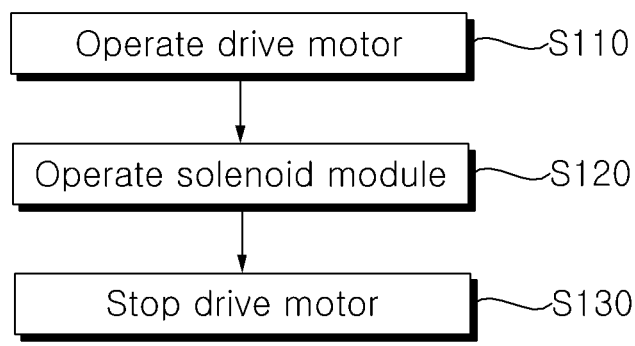
FIG. 19 is a sequential chart showing in detail a mode resetting step according to another exemplary embodiment of the present disclosure.

Referring to FIGS. 19 and 20, the mode resetting step S100 according to a second exemplary embodiment will be described.

In the mode resetting step S100, a step S100 in which the drive motor 21 operates, a step S120 in which the solenoid module 27 operates, and a step S130 in which the drive motor 21 stops operating are performed.

In the mode resetting step S100, the controller 142 operates the solenoid module 27 while the drive motor 21 is operating.

Referring to FIG. 20, the step S100 in which the drive motor 21 operates may comprise an acceleration step S112, a constant speed maintaining step S114, and a deceleration step S116. The step S120 in which the solenoid module 27 operates may be performed in the step S116 in which the drive motor 21 decelerates.

Referring to FIG. 20, the step S120 in which the solenoid module 27 operates may be performed after a given period of time after the start of the step S116 in which the drive motor 21 decelerates. Referring to FIG. 20, the step S130 in which the drive motor 21 stops rotating may be performed after more than a given period of time after the step S120 in which the solenoid module 27 operates.

In the mode resetting step S100, a second mode change step S300 may be performed but not the first mode change step S200.

That is, the coupler 28 in the second position P2 does not engage the coupling flange 21232, and therefore the coupler 28 moves to the first position P1 as shown in FIGS. 15A to 15D when the solenoid module 27 operates in the mode resetting step S100.

On the other hand, the coupler 28 in the first position P1 engages the coupling flange 21232, and therefore rotates together with the drive shaft 22 when the drive motor 21 operates. At this point, frictional noise between the coupling flange 21232 and the coupler 28 increases while the drive motor 21 accelerates or decelerates. Thus, the coupler 28 is restrained from moving upward even when the solenoid module 28 operates. It is preferable that the solenoid module 27 operates while the drive motor 21 decelerates, in order to prevent damage caused by friction with the coupling flange 21232 when the coupler 28 in the second position P2 moves downward.

Accordingly, while the mode resetting step S100 is implemented, the coupler 28 moves to the first position P1.

Afterwards, the first mode change step S200a is performed to move the coupler in the first position P1 of the first mode M1 to the second position P2 of the second mode M2. This step is performed in the same manner as changing the configuration of the coupler 28 explained previously with reference to FIGS. 13A to 13D.

Next, the second mode change step S200b is performed to move the coupler in the second position P2 of the second mode M2 to the first position P1 of the first mode M1. This step is performed in the same manner as changing the configuration of the coupler 28 explained previously with reference to FIGS. 14A to 14D.

<Mode Check and Error Detection>

Hereinafter, a control method for a washing machine according to the present disclosure will be described with reference to FIGS. 18 and 19.

In the control method for a washing machine according to the present disclosure, a mode check step S300 may be performed in a washing stroke or dewatering stroke by operating the drive motor 21 after the mode change step S200.

In the mode check step S300, when the drive motor 21 is operated, any error in the drive motor 21 may be detected by sensing the load of current flowing to the drive motor 21.

In the mode check step S300, the error count E is increased if the load sensed by the operation of the drive motor 21 does not satisfy a set value. Also, in the mode check step S300, an error signal of the drive motor 21 is sent if the error count E increases to more than a certain level.

In the mode check step S300, the mode resetting step S100 may be performed if the error count E increases to more than a certain level.

Figure 18:
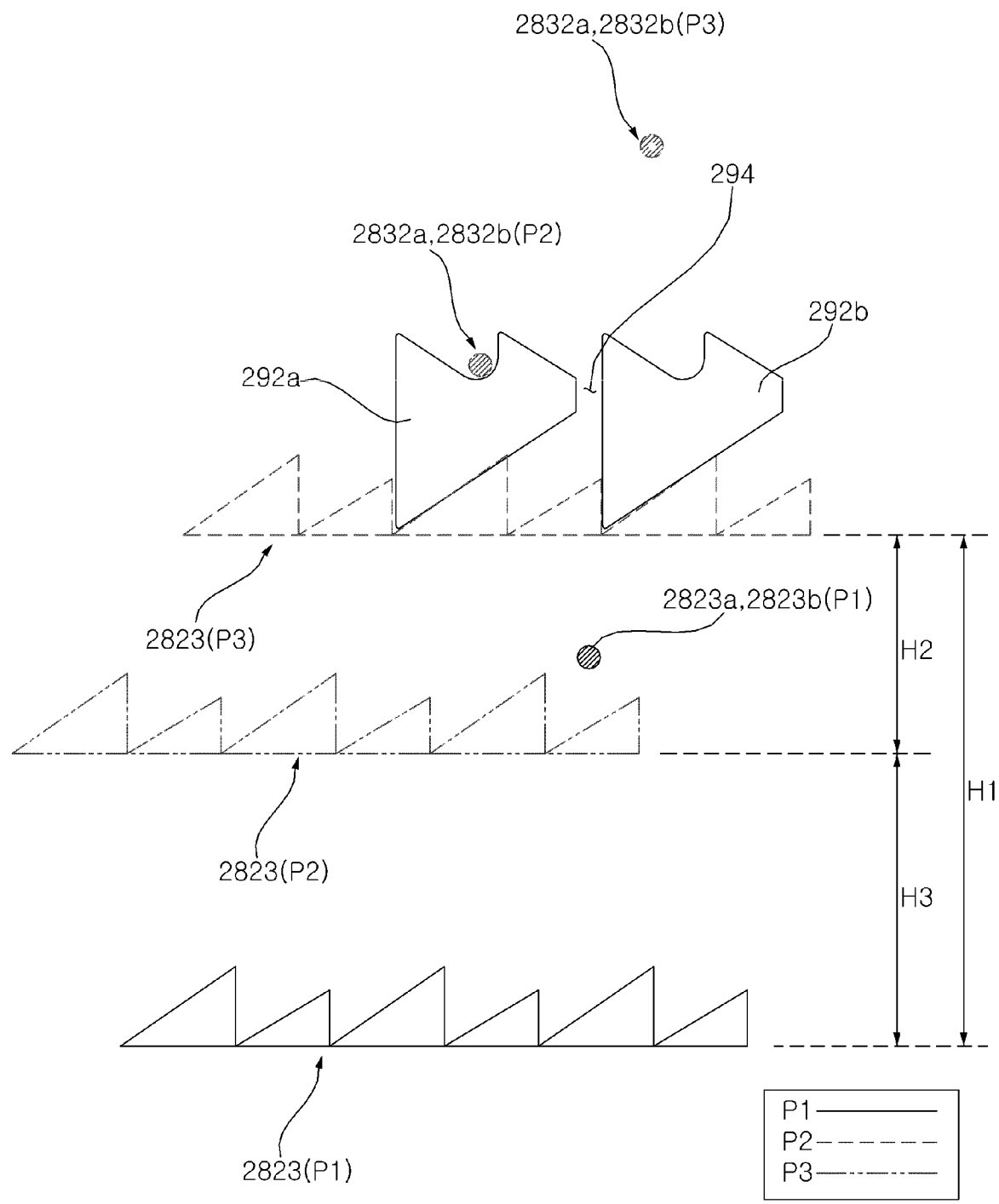
FIG. 18 is a view for explaining the configurations of guide projections and a coupler when the coupler is in a first position P1, a second position P2, and a third position P3, according to an exemplary embodiment of the present disclosure.

Referring to FIG. 18, the mode check step S300 may be performed after the mode change step S200. Here, the mode change step S200 may be either the first mode change step S200a or the second mode change step S200b. In the mode check step S300, if the load of current flowing to the drive motor 21 satisfies a set value, a mode implementation step S400 is implemented to perform a washing stroke or dewatering stroke, which involves changing modes in the mode change step S20. That is, if the first mode change step S200a is performed in the mode change step S200, the washing stroke may be performed in the mode implementation step S400, and if the second mode change step S200b is performed in the mode change step S200, the dewatering stroke may be performed in the mode implementation step S400.

The set load values required for the washing stroke and dewatering stroke are set. That is, the set load value required for the dewatering stroke is greater than the set load value required for the washing stroke.

Referring to FIG. 19, the mode check step S300 will be described concretely.

In the mode check step S300, the error count E starts at "0" (S312). The controller 142 makes the drive motor 21 operate, and the load sensing portion 144 senses the load of current flowing to the drive motor 21 (S314). The controller 142 determines whether the load sensed by the load sensing portion 144 satisfies a set load value (S316).

If the load sensed by the load sensing portion 144 satisfies a set load value, the controller 142 may perform a washing stroke or dewatering stroke (S400). If the load sensed by the load sensing portion 144 does not satisfy a set load value, the controller 142 increases the error count E (S318).

The controller 142 repetitively performs the steps S312 to S318, and, when the error count E equals a first set value N (S330), the controller 142 performs a coupler setting step S332.

In the coupler setting step S332, only the mode resetting step S100 may be performed, or both the mode resetting step S100 and the first mode change step S200a may be performed. If the mode change step S200 is the second mode change step S200b for performing the washing stroke, the mode resetting step S100 and the first mode change step S200a are performed, and, if the mode change step S200 is the first mode change step S200a for performing the dewatering stroke, only the mode resetting step S100 is performed.

That is, once the mode resetting step S100 is performed, the coupler 29 moves to the first position P1 and becomes capable of the dewatering stroke. Accordingly, if the mode change step S200 is the first mode change step S200a for performing the washing stroke, the first mode change step S200a is implemented after the mode resetting step S100 to change the position of the coupler 28 that enables the washing stroke.

After the coupler setting step S332, the controller 142 makes the drive motor 21 operate, and the load sensing portion 144 performs a step S334 of sensing the load of current outputted to the drive motor 21. The controller 142 determines whether the load value sensed by the load sensing portion 144 satisfies a set load value (S336).

If the load value sensed by the load sensing portion 144 satisfies a set load value, the mode implementation step S400 is performed (S400). If the load value sensed by the load sensing portion 144 does not satisfy a set load value, the error count step S318 is performed.

The controller 142 repetitively performs the steps S312 to S318, and, when the error count E equals a second set value N2, the controller 142 sends a motor error signal to a notification portion 146.

The second set value N2 may be greater than the first set value N1.

If the error count E satisfies the second set value N2, the controller 142 may perform a clothes loosening stroke S322. That is, if the mode change step S200 is the second mode change step S200b for performing the washing stroke, the clothes loosening stroke S322 is performed. Accordingly, if the mode change step S200 is the second mode change step S200b for performing the dewatering stroke, the clothes loosening stroke S322 may be omitted.

Here, the "clothes loosening stroke" may refer to a stroke in which clothes are untangled through a water supply process or through a process of rotating the drive motor to agitate the washing tub from side to side, in a case where the drive motor 21 cannot work properly due to overload in the motor caused by clothes entangled in a washing process.

After the clothes loosening stroke S322, the controller 142 may make the drive motor 21 operate, and the load sensing portion 144 may sense the load of current outputted to the drive motor 21.

The controller 142 determines whether the load sensed by the load sensing value 144 satisfies a set load value (S326), and, if the load sensed by the load sensing portion 144 satisfies a set load value, performs the mode implementation step S400 (S400). If the load sensed by the load sensing portion 144 does not satisfy a set load value, the controller 142 may send a motor error signal to the notification portion 146 (S328).

Exemplary embodiments of the present disclosure have been illustrated and described above, but the present disclosure is not limited to the above-described specific embodiments, it is obvious that various modifications may be made by those skilled in the art, to which the present disclosure pertains without departing from the gist of the present disclosure, which is claimed in the claims, and such modification should not be individually understood from the technical spirit or prospect of the present disclosure.

A washing machine of the present disclosure has one or more of the following advantages:

Firstly, the washing machine comprises a coupler guide that rotates itself or fixes the position of the coupler, when the coupler moves upward in the lengthwise direction of the dewatering shaft, whereby the coupler may be fixed in position by the solenoid module once moved upward. Specifically, with a structure in which the coupler moving up and down the dewatering shaft locks onto the coupler guide moving in a circumferential direction of the dewatering shaft, the coupler may be fixed in position by the solenoid module once moved upward. Due to this, the coupler may be fixed in position once moved upward, without continuous operation of the solenoid module, thereby reducing power consumption and solving the problem of heat generation from a coil. Moreover, the problem of abnormal operation of the solenoid module may be prevented.

Secondly, it is possible to figure out the configuration of the coupler by resetting the position of the coupler to the first position, since the coupler is restrained from moving upward when in the first position and moves upward freely when in the second position, by operating the solenoid module while the drive motor is operating. This allows for figuring out the configuration of the coupler without a sensor during washing, which may lead to a reduction in material costs. Moreover, it is possible to figure out the configuration of the coupler through the mode resetting step, and, therefore, the washing tub and pulsator can operate correctly when laundry washing is performed.

Thirdly, since the solenoid module is operated while the drive motor decelerates, frictional force with the coupling flange generated when the coupler moves downward may be minimized, thus ensuring the lifespan of the coupler.

Fourthly, if a generated load does not meet the load of current required for an actual washing stroke or dewatering stroke, problems caused by a configuration error in the coupler may be resolved quickly by adjusting the configuration of the coupler through the coupler setting step. This allows for figuring out the configuration of the coupler without a sensor during washing, and in turn the configuration of the coupler may be adjusted, which may lead to a reduction in material costs. That is, it is possible to figure out the configuration of the coupler by resetting the configuration of the coupler to the first position, and, therefore, the washing tub and pulsator can operate correctly when laundry washing is performed.

Fifthly, any error related to malfunctioning of the motor, which may be caused by entanglement of clothes, can be solved quickly by adjusting the configuration of the coupler or by loosening the clothes.

The advantageous effects of the present disclosure are not limited to the aforementioned ones, and other advantageous effects, which are not mentioned above, will be clearly understood by those skilled in the art from the claims.

What is claimed is:

1. A method for controlling a washing machine including a washing tub, a pulsator disposed in the washing tub, a dewatering shaft configured to rotate the washing tub, a drive shaft connected to the pulsator, a drive motor configured to rotate the drive shaft, a coupler configured to couple the dewatering shaft to the drive shaft and to decouple the dewatering shaft from the drive shaft, a solenoid module configured to move the coupler along the dewatering shaft, a coupler guide disposed at the dewatering shaft, and a controller configured to control operation of at least one of the drive motor or the solenoid module, wherein the coupler includes (i) a coupler body configured to move up and down the dewatering shaft and to receive torque from the drive motor, (ii) a guide member including locking protrusions that at least partially protrude inward from a periphery of the coupler body and are configured to lock onto an upper side of the coupler guide, and (iii) one or more stoppers that have a sloping surface on an inner periphery of the coupler body and are configured to restrain an upwards movement of the coupler body by contacting the coupler guide, wherein the coupler guide is configured to rotate in one direction based on contacting the one or more stoppers and includes a plurality of guide projections that define locking grooves configured to lock to the locking protrusions of the guide member, the coupler guide defining guide holes between the plurality of guide projections through which the guide member passes, the method comprising:
operating the drive motor to rotate the drive shaft;
while operating the drive motor, operating the solenoid module to generate force to move the coupler, and
stopping an operation of the drive motor.

2. The method of claim 1, wherein operating the drive motor comprises:
accelerating a speed of rotation of the drive shaft; and
decelerating the speed of rotation of the drive shaft.

3. The method of claim 2, wherein operating the solenoid module comprises operating the solenoid module while decelerating the speed of rotation of the drive shaft.

4. The method of claim 3, wherein operating the drive motor further comprises maintaining the speed of rotation of the drive shaft after accelerating the speed of rotation of the drive shaft.

5. The method of claim 2, wherein operating the solenoid module comprises operating the solenoid module based on an elapse of a predetermined period of time after a start of deceleration of the drive motor.

6. The method of claim 2, wherein stopping the operation of the drive motor comprises stopping the operation of the drive motor based on an elapse of a predetermined period or more of time after operating the solenoid module.

7. A method for controlling a washing machine including a washing tub, a pulsator disposed in the washing tub, a dewatering shaft configured to rotate the washing tub, a drive shaft connected to the pulsator, a drive motor configured to rotate the drive shaft, a coupler configured to couple the dewatering shaft to the drive shaft and to decouple the dewatering shaft from the drive shaft, a solenoid module configured to move the coupler along the dewatering shaft, a coupler guide disposed at the dewatering shaft, and a controller configured to control operation of at least one of the drive motor or the solenoid module, wherein the coupler includes (i) a coupler body configured to move up and down the dewatering shaft and to receive torque from the drive motor, (ii) a guide member including locking protrusions that at least partially protrude inward from a periphery of the coupler body and are configured to lock onto an upper side of the coupler guide, and (iii) one or more stoppers that have a sloping surface on an inner periphery of the coupler body and are configured to restrain an upwards movement of the coupler body by contacting the coupler guide, wherein the coupler guide is configured to rotate in one direction based on contacting the one or more stoppers and includes a plurality of guide projections that define locking grooves configured to lock to the locking protrusions of the guide member, the coupler guide defining guide holes between the plurality of guide projections through which the guide member passes, the method comprising:
performing a mode change operation that comprises operating the solenoid module to move the coupler; and
performing a mode check operation that comprises:
operating the drive motor to rotate the drive shaft, and sensing a load of current outputted to the drive motor, and
performing a coupler setting operation that comprises operating the solenoid module to reposition the coupler based on the load of current outputted to the drive motor being outside a set load range, the coupler setting operation comprising a mode resetting operation to move the coupler to a coupling position to thereby couple the drive shaft and the dewatering shaft to each other,
wherein the mode resetting operation comprises:
operating the drive motor to rotate the drive shaft,
while operating the driving motor, operating the solenoid module to generate force to move the coupler, and
stopping operation of the drive motor.

8. The method of claim 7, wherein performing the mode check operation further comprises:
repetitively sensing the load of current outputted to the drive motor and determining whether the load of current applied to the drive motor is within the set load range; and based on a determination that the load of current applied to the drive motor is outside the set load range, increasing an error count.

9. The method of claim 8, wherein performing the mode check operation further comprises:
based on the error count being equal to a first set value, operating the solenoid module to reposition the coupler or performing the mode resetting operation.

10. The method of claim 7, wherein the coupler setting operation further comprises:
after performing the mode resetting step, performing a first mode change operation that comprises operating the solenoid module to move the coupler to a decoupling position to thereby decouple the drive shaft and the dewatering shaft from each other.

11. The method of claim 7, wherein the mode check operation further comprises:
after performing the coupler setting operation, operating the drive motor to rotate the drive shaft, sensing the load of current outputted to the drive motor, and increasing an error count based on the load of current applied to the drive motor being outside the set load range.

12. The method of claim 11, wherein the mode check operation further comprises:
based on the error count being equal to a first set value, operating the solenoid module to reposition the coupler or performing the mode resetting operation; and
transmitting a motor error signal based on the error count being equal to a second set value greater than the first set value.

13. The method of claim 12, wherein performing the mode change operation comprises:
performing a first mode change operation comprising moving the coupler to a decupling position to thereby decouple the drive shaft and the dewatering shaft from each other; and
performing a second mode change operation comprising moving the coupler to the coupling position to thereby couple the drive shaft and the dewatering shaft to each other,
wherein performing the mode check operation further comprises performing a clothes loosening stroke based on the error count being equal to the second set value after the first mode change operation is performed, and
wherein transmitting the motor error signal comprises transmitting the motor error signal based on the load of current applied to the drive motor being outside the set load range after the clothes loosening stroke is performed.

14. The method of claim 7, further comprising operating the drive motor based on the load of current outputted to the drive motor being within the set load range.

* * * * *